(12) United States Patent
Nishio et al.

(10) Patent No.: US 11,995,995 B2
(45) Date of Patent: May 28, 2024

(54) INFORMATION PROCESSING DEVICE, INFORMATION PROCESSING METHOD, PROGRAM, AND MOBILE DEVICE

(71) Applicant: Sony Corporation, Tokyo (JP)

(72) Inventors: Masato Nishio, Tokyo (JP); Yuhei Yabe, Tokyo (JP)

(73) Assignee: SONY CORPORATION, Tokyo (JP)

( * ) Notice: Subject to any disclaimer, the term of this patent is extended or adjusted under 35 U.S.C. 154(b) by 490 days.

(21) Appl. No.: 17/261,577

(22) PCT Filed: Jul. 3, 2019

(86) PCT No.: PCT/JP2019/026432
§ 371 (c)(1),
(2) Date: Jan. 20, 2021

(87) PCT Pub. No.: WO2020/049850
PCT Pub. Date: Mar. 12, 2020

(65) Prior Publication Data
US 2021/0295554 A1    Sep. 23, 2021

(30) Foreign Application Priority Data

Sep. 4, 2018  (JP) ................................ 2018-165362

(51) Int. Cl.
*G06T 7/73* (2017.01)
*B64C 39/02* (2023.01)
(Continued)

(52) U.S. Cl.
CPC ......... *G08G 5/0021* (2013.01); *B64C 39/024* (2013.01); *G05D 1/0016* (2013.01);
(Continued)

(58) Field of Classification Search
CPC ...... G08G 5/0021; G08G 5/04; G08G 5/0052; G08G 5/0069; G08G 5/0078; G08G 5/045;
(Continued)

(56) References Cited

U.S. PATENT DOCUMENTS 9,754,165 B2 *  9/2017  Mundhenk ........... G06V 20/176
10,852,364 B2 * 12/2020  Kushleyev ......... G01R 33/0017
(Continued)

FOREIGN PATENT DOCUMENTS

CN   1782665 A    6/2006
CN   105759834 A  7/2016
(Continued)

OTHER PUBLICATIONS

International Search Report and Written Opinion dated Oct. 1, 2019, received for PCT Application PCT/JP2019/026432, Filed on Jul. 3, 2019, 10 pages including English Translation.

*Primary Examiner* — Jerome Grant, II
(74) *Attorney, Agent, or Firm* — XSENSUS LLP

(57) ABSTRACT

It is intended to allow an orientation of a mobile device observed in imaging data to be more appropriately specified. There is provided an information processing device (100) including an acquisition unit (111c) that acquires the imaging data and a direction specification unit (111c) that analyzes the imaging data to specify the orientation of the mobile device observed in the imaging data.

14 Claims, 30 Drawing Sheets

(51) Int. Cl.
  *G05D 1/00*  (2006.01)
  *G06V 10/24* (2022.01)
  *G06V 20/10* (2022.01)
  *G06V 20/13* (2022.01)
  *G06V 20/17* (2022.01)
  *G08G 5/00*  (2006.01)
  *G08G 5/04*  (2006.01)
  *H04N 5/38*  (2006.01)

(52) U.S. Cl.
  CPC ............. *G05D 1/1064* (2019.05); *G06T 7/73* (2017.01); *G06V 10/243* (2022.01); *G06V 20/10* (2022.01); *G06V 20/13* (2022.01); *G06V 20/17* (2022.01); *G08G 5/04* (2013.01); *H04N 5/38* (2013.01); *B64U 2201/20* (2023.01); *G06T 2207/30204* (2013.01)

(58) Field of Classification Search
  CPC .... B64C 39/024; B64C 13/16; G05D 1/0016; G05D 1/1064; G06T 7/73; G06T 2207/30204; G06T 2207/10021; G06T 2207/10024; G06T 2207/10028; G06T 2207/20081; G06T 2207/20084; G06T 2207/30261; G06V 10/243; G06V 20/10; G06V 20/13; G06V 20/17; H04N 5/38; H04N 23/10; H04N 23/695; B64U 2201/20; G03B 15/006
  USPC ........................................................ 382/103
  See application file for complete search history.

(56) References Cited

U.S. PATENT DOCUMENTS

| | | |
|---|---|---|
| 2016/0291594 A1 | 10/2016 | Zhao et al. |
| 2017/0076175 A1 | 3/2017 | Sugaya |

FOREIGN PATENT DOCUMENTS

| | | | | |
|---|---|---|---|---|
| EP | 3614341 | * | 2/2020 | ............... G06T 7/55 |
| JP | 6-26859 A | | 2/1994 | |
| JP | 2010-15194 A | | 1/2010 | |
| JP | 2015-95225 A | | 5/2015 | |
| JP | 2017-58831 A | | 3/2017 | |
| JP | 2017-529616 A | | 10/2017 | |
| JP | 2017-207815 A | | 11/2017 | |
| WO | WO-2004081683 A1 | | 9/2004 | |

* cited by examiner

INFORMATION PROCESSING DEVICE, INFORMATION PROCESSING METHOD, PROGRAM, AND MOBILE DEVICE

CROSS-REFERENCE TO RELATED APPLICATIONS

The present application is based on PCT filing PCT/JP2019/026432, filed Jul. 3, 2019, which claims priority to JP 2018-165362, filed Sep. 4, 2018, the entire contents of each are incorporated herein by reference.

TECHNICAL FIELD

The present disclosure relates to an information processing device, an information processing method, a program, and a mobile device.

BACKGROUND ART

In recent years, a system, a service, or the like using an unmanned aerial vehicle (UAV) has actively been developed. For example, PTL 1 described below discloses a technique which allows an object observed in imaging data obtained by aerial photography using an unmanned aerial vehicle to be specified and allows a position of the object to be specified. Meanwhile, PTL 2 discloses a technique which measures a distance to an obstacle and a speed to avoid a collision between an unmanned aerial vehicle and the object.

CITATION LIST

Patent Literature

[PTL 1]
JP 2017-58831 A
[PTL 2]
Japanese Translation of PCT Application No. 2017-529616

SUMMARY

Technical Problem

However, with the technique disclosed in PTL 1, it is impossible specify an orientation of a mobile device observed in the imaging data. Meanwhile, with regard to the technique disclosed in PTL 2, in such a case where the speed of the unmanned aerial vehicle or the speed of the obstacle is high, it may be possible to more reliably and more rapidly avoid the collision between the unmanned aerial vehicle and the obstacle by not only merely measuring the distance and the speed, but also specifying an orientation of the obstacle corresponding to a moving direction thereof and giving consideration to the orientation.

The present disclosure has been achieved in view of the foregoing and provides an information processing device, an information processing method, a program, and a mobile device which are novel and improved and allow an orientation of a mobile device observed in imaging data to be more appropriately specified.

Solution to Problem

The present disclosure provides an information processing device including: an acquisition unit that acquires imaging data; and a direction specification unit that analyzes the imaging data to specify an orientation of a mobile device observed in the imaging data.

The present disclosure also provides an information processing method to be implemented by a computer, the method including: acquiring imaging data; and analyzing the imaging data to specify an orientation of a mobile device observed in the imaging data.

The present disclosure also provides a program for causing a computer to execute: acquiring imaging data; and analyzing the imaging data to specify an orientation of a mobile device observed in the imaging data.

The present disclosure also provides a mobile device including: an imaging unit that generates imaging data; a communication unit that transmits the imaging data to an information processing device that analyzes the imaging data to specify an orientation of another mobile device observed in the imaging data; and a movement control unit that moves the local device based on control by the information processing device.

Advantageous Effects of Invention

According to the present disclosure, it is possible to more appropriately specify an orientation of a mobile device observed in imaging data.

Note that the effects described above are not necessarily limitative. In addition to or instead of the effects described above, any of the effects shown in the present description or another effect that can be understood from the present description may also be achieved.

BRIEF DESCRIPTION OF DRAWINGS

FIG. 2 is a block diagram illustrating an example of functional configurations of a mobile device 100a.

FIG. 7 is a flow chart illustrating an example of a flow of processing in which the position and the orientation of the mobile device 100b are specified by the mobile device 100a.

DESCRIPTION OF EMBODIMENTS

Figure 1:
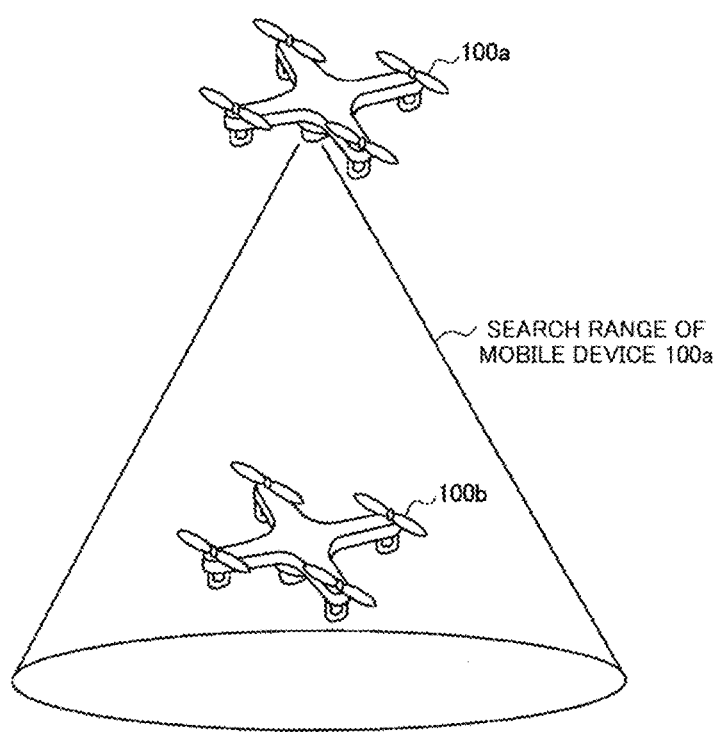
FIG. 1 is a diagram illustrating an example of a system configuration of an information processing system according to a first embodiment of the present disclosure.

Referring to the accompanying drawings, a detailed description will be given below of preferred embodiments of the present disclosure. Note that, in the present description and the drawings, components having substantially identical functional configurations are given the same reference numerals, and a repeated description thereof is omitted.

Note that the description will be given in the following order.

1. First Embodiment
1.1. Example of System Configuration
1.2. Example of Functional Configurations of Mobile Device 100
1.3. Example of Flows of Processing
2. Second Embodiment
2.1. Example of System Configuration
2.2. Example of Functional Configurations of Mobile Device 100
2.3. Example of Functional Configurations of Flight Control Device 200
2.4. Example of Flows of Processing
3. Modifications
3.1. Variation of Mobile Device 100
3.2. Variation of Method of Specifying Orientation
4. Notes
5. Example of Hardware Configuration
6. Summary

1. First Embodiment

1.1. Example of System Configuration

First, referring to FIG. 1, a description will be given of an example of a system configuration of an information processing system according to the first embodiment of the present disclosure. As illustrated in FIG. 1, the information processing system according to the present embodiment includes mobile devices 100 capable of unmanned flights (a mobile device 100a and a mobile device 100b in the example in FIG. 1. Note that, when merely referred to as such, the "mobile devices 100" hereinafter include both of the mobile device 100a and the mobile device 100b).

The information processing system according to the present embodiment is assumed to be a system in which one or more mobile devices 100 autonomously fly. Note that a system to which the present disclosure is applied is not limited thereto. For example, the present disclosure is applicable to various systems in which modes (such as, e.g., orientations and positions of the mobile devices 100) of movement of the mobile devices 100 are analyzed. More specifically, the present disclosure may also be applied to a system in which the orientations and the positions of the mobile devices 100 are analyzed in a case where the mobile devices 100 do not fly but move on earth or on water.

Each of the mobile devices 100 according to the present embodiments is a device capable of an unmanned flight and including an imaging unit 130 that generates imaging data, and is also an information processing device. The mobile device 100 can autonomously control the flight through analysis of the imaging data generated by the imaging unit 130 or the like. For example, when the mobile device 100 is flying and an obstacle appears in a direction of travel thereof, the mobile device 100 may also analyze the imaging data generated by the imaging unit 130 to recognize the obstacle and fly so as to avoid a collision (the flight may be hereinafter referred to as a "collision avoidance flight").

For example, the mobile device 100a acquires the imaging data generated by the imaging unit 130, analyzes the image data, and can thus specify an orientation of the mobile device 100b observed in the imaging data. More specifically, the mobile device 100a specifies, as the orientation of the mobile device 100b, at least one of a direction in which the mobile device 100b is moving, a direction in which the mobile device 100b is movable, and a direction in which the mobile device 100b is expected to move. Each of the direction in which the mobile device 100b is moving, the direction in which the mobile device 100b is movable, and the direction in which the mobile device 100b is expected to move may be either a two-dimensional direction or a three-dimensional direction.

A more specific description will be given of a method of specifying the orientation of the mobile device 100b. The mobile device 100a can specify the orientation of the mobile device 100b based on a feature of the mobile device 100b. For example, the mobile device 100a can specify the orientation of the mobile device 100b based on a propeller, a camera, or the like of the mobile device 100b. A portion such as the propeller or the camera used herein to specify the orientation may be referred to as a "feature domain 10" (in other words, the feature domain refers to a portion included in the mobile device 100b, such as the propeller or the camera, or a predetermined portion located around such a portion). Details of a method of specifying the orientation of the mobile device 100b based on the feature of the mobile device 100b (i.e., the feature domain 10) will be described later.

The mobile device 100a can specify not only the orientation of the mobile device 100b observed in the imaging data, but also a position of the mobile device 100b. More specifically, the mobile device 100a is equipped with a GNSS (Global Navigation Satelite System) receiver, an atmospheric pressure sensor, or the like (such sensors to be used to specify the position of the mobile device 100a may be referred to also as "positioning sensors") and can specify positional coordinates of the local device in a three-dimensional space based on sensor data acquired by such sensors. The mobile device 100a recognizes a relative positional relationship between the local device and the mobile device 100b based on the position of the mobile device 100b in the imaging data generated by the imaging unit 130, and can thus specify the positional coordinates of the mobile device 100b.

In addition, the mobile device 100a can predict the orientation or position of the mobile device 100b at a given future time point based on the orientation and the position (i.e., the positional coordinates) each output by the processing described above. Furthermore, the mobile device 100a can control movement (flight in the present embodiment) of the local device or the mobile device 100b based on a result of predicting the orientation or position. Details of such functions of the mobile device 100a will be described later.

It is assumed that, as illustrated in FIG. 1, each of the mobile devices 100 according to the present embodiment is a multicopter-type flyable device, but the mobile device 100 is not necessarily limited thereto. For example, the mobile device 100 may also be an airplane-type flyable device (such as a vertical take-off and landing (VTOL) device), a helicopter-type flyable device, or the like. The VTOL has respective properties of both an airplane type and a helicopter type. As described above, it is assumed that each of the mobile devices 100 according to the present embodiment is an unmanned flyable device, but the mobile device 100 is not necessarily limited thereto. For example, the mobile device 100 may also be a manned flyable device. Alternatively, the mobile device 100 may also be a merely movable device not having a flying function. A detailed description will be given of an example of a case where the mobile device 100 is a movable device not having the flying function in "3. Modifications".

The description has been given heretofore of the example of the configuration of the information processing system according to the present embodiment. Note that the configuration described above with reference to FIG. 1 is only exemplary, and the configuration of the information processing system according to the present embodiment is not limited to that in such an example. For example, any or all of the functions of each of the mobile devices 100 may be implemented by another external device. Alternatively, it may also be possible that the mobile device 100 is a device separate from a flyable device and implement the functions described above by being attached to the flyable device by a user. Still alternatively, it may also be possible that the mobile device 100 does not include the imaging unit 130 but the mobile device 100 implements the functions described above by communicating with the imaging unit 130 (e.g., camera) provided separately. Note that the number of the mobile devices 100 is not particularly limited. The configuration of the information processing system according to the present embodiment can flexibly be modified depending on specifications and operation.

1.2. Example of Functional Configurations of Mobile Device 100

The description has been given above of the example of the system configuration of the information processing system according to the present embodiment. Subsequently, referring to FIG. 2, a description will be given of an example of functional configurations of each of the mobile devices 100 (the mobile device 100a in the example in FIG. 2).

Figure 2:
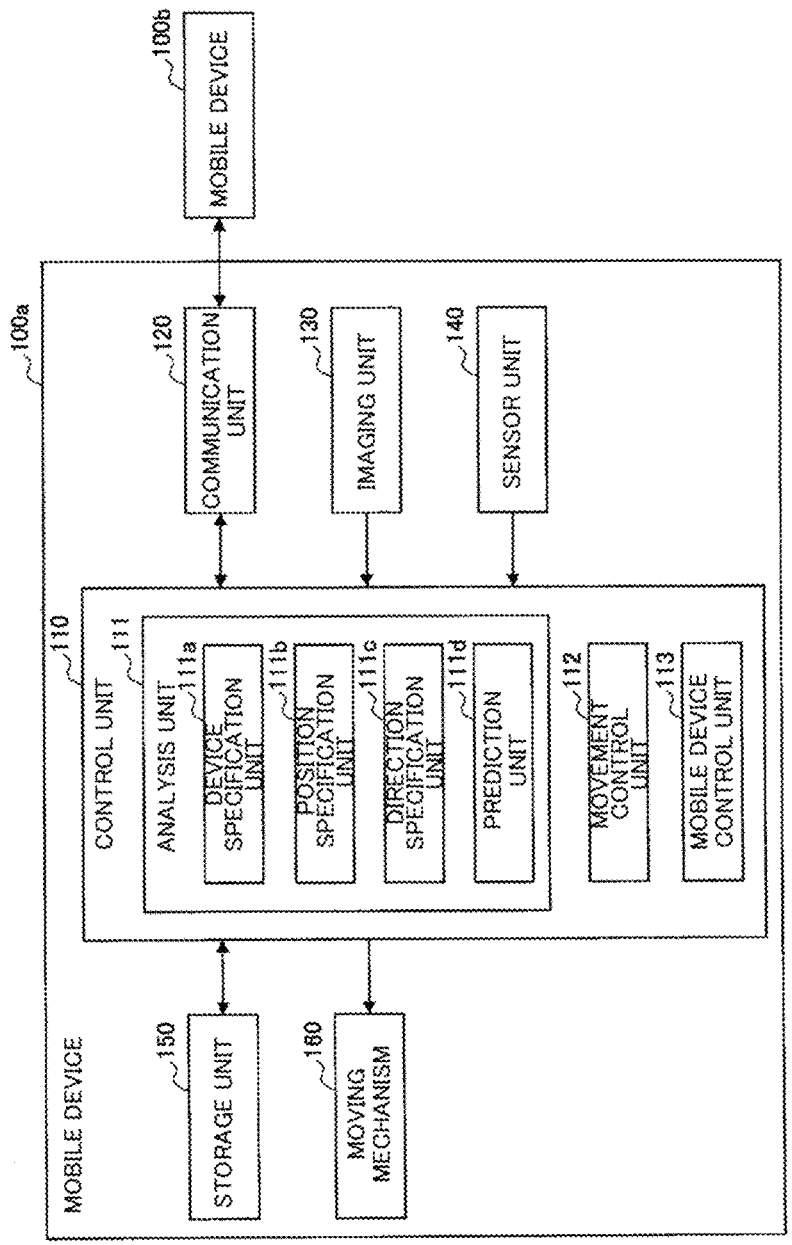

As illustrated in FIG. 2, the mobile device 100a includes a control unit 110, a communication unit 120, the imaging unit 130, a sensor unit 140, a storage unit 150, and a moving mechanism 160.

(Control Unit 110)

The control unit 110 is the functional configuration that generally controls general processing to be performed by the mobile device 100a. For example, the control unit 110 can control starting and stopping of each of the functional configurations. Note that details of the control by the control unit 110 are not particularly limited. For example, the control unit 110 may also control processing (such as, e.g., processing performed by an OS (Operating System)) generally performed in various servers, versatile computers, PCs (Personal Computers), tablet PCs, or the like. As illustrated in FIG. 2, the control unit 110 includes an analysis unit 111, a movement control unit 112, and a mobile device control unit 113.

(Analysis Unit 111)

The analysis unit 111 is the functional configuration that analyzes the imaging data generated by the imaging unit 130 and various sensor data acquired by the sensor unit 140. As illustrated in FIG. 2, the analysis unit 111 includes a device specification unit 111a, a position specification unit 111b, a direction specification unit 111c, and a prediction unit 111d.

(Device Specification Unit 111a)

The device specification unit 111a is the functional configuration that analyzes the imaging data generated by the imaging unit 130 to specify the mobile device 100b observed in the imaging data. For example, the device specification unit 111a preliminarily acquires feature values of the mobile device 100b extracted from the imaging data resulting from imaging of the mobile device 100b. Then, the device specification unit 111a compares the feature values to feature values extracted from the imaging data generated by the imaging unit 130 to specify the mobile device 100b observed in the imaging data generated by the imaging unit 130. When there are a plurality of types of the mobile devices 100*b*, the device specification unit 111*a* compares the respective feature values of the mobile devices 100*b* to the feature values extracted from the imaging data generated by the imaging unit 130, retrieves the most similar mobile device 100*b*, and can thus specify the mobile device 100*b*.

When the mobile device 100*b* is an unknown tangible entity (in other words, when the device specification unit 111*a* has not preliminarily acquired the feature values of the mobile device 100*b*, the device specification unit 111*a* may also cooperate with an external device to specify the mobile device 100*b*. For example, the device specification unit 111*a* may also use feature values of the tangible entity observed in the imaging data generated by the imaging unit 130 (or any information related to the tangible entity) to retrieve a similar tangible entity on the Internet and specify the mobile device 100*b*.

When a tangible entity other than the mobile device 100*b* is observed in the imaging data, the device specification unit 111*a* may also specify the tangible entity. For example, the device specification unit 111*a* may also preliminarily acquire feature values of various tangible entities and compare the feature values to the feature values extracted from the imaging data to specify the tangible entity other than the mobile device 100*b*. Alternatively, as described above, the device specification unit 111*a* may also specify the tangible entity other than the mobile device 100*b* through cooperation with an external device (such as, e.g., a server on the Internet) or the like.

Note that a method used by the device specification unit 111*a* to specify the mobile device 100*b* and the other tangible entity is not limited to the method described above. For example, when the mobile device 100*b* or the tangible entity other than the mobile device 100*b* is equipped with a tag device capable of communication with the mobile device 100*a* or the like, the device specification unit 111*a* may also receive identification information (such as, e.g., an ID) of the mobile device 100*b* or the other tangible entity from the tag device via the communication unit 120 to specify the mobile device 100*b* or the other tangible entity.

(Position Specification Unit 111*b*)

The position specification unit 111*b* is the functional configuration that analyzes the imaging data generated by the imaging unit 130 to specify the position of the mobile device 100*b* observed in the imaging data. More specifically, the sensor unit 140 includes the positioning sensor such as the GNSS receiver or the atmospheric pressure sensor, and the position specification unit 111*b* acquires sensor data from the sensor unit 140 and analyzes the sensor data to specify the positional coordinates of the local device in the three-dimensional space.

Then, the position specification unit 111*b* analyzes the imaging data generated by the imaging unit 130 and recognizes a relative positional relationship between the local device and the mobile device 100*b* based on the position of the mobile device 100*b* in the imaging data to specify the positional coordinates of the mobile device 100*b* in the three-dimensional space. It is assumed herein that the "position of the mobile device 100*b*" is a position of a gravity center 20 of the mobile device 100*b* specified based on features (i.e., the feature domains 10) of the mobile device 100*b*, but the "position of the mobile device 100*b*" is not limited thereto. For example, the "position of the mobile device 100*b*" may also be a position of a predetermined portion of the mobile device 100*b*. It is also assumed that the "positional coordinates of the mobile device 100*b*" are coordinates of the position of the mobile device 100*b* represented by a three-dimensional orthogonal coordinate system (e.g., an x-coordinate, a y-coordinate, and a z-coordinate) when a predetermined point (hereinafter referred to as a "reference point") is used as a reference.

Figure 3:
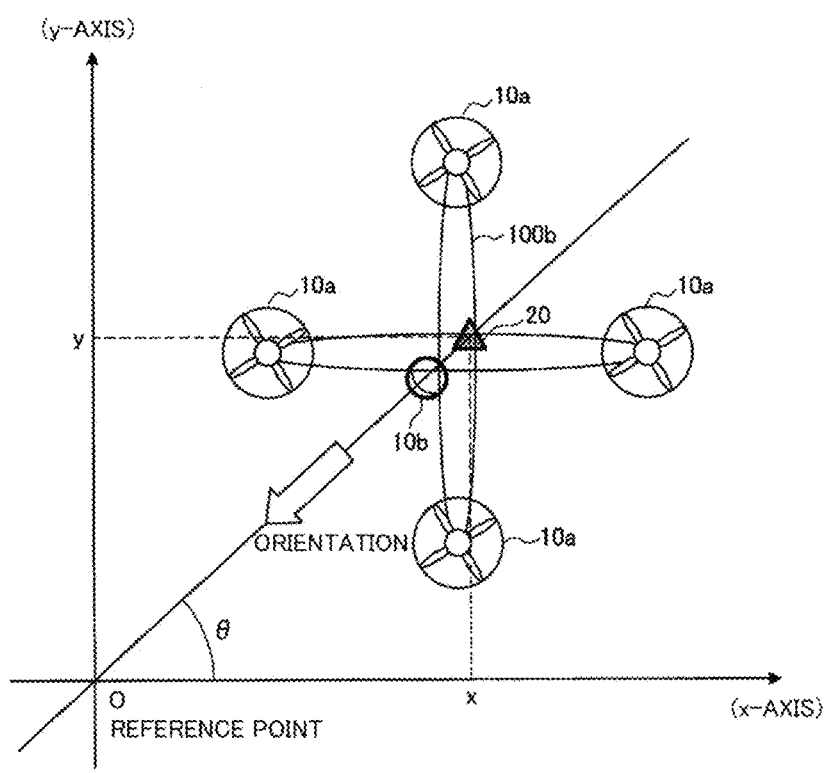
FIG. 3 is a diagram for illustrating a method of specifying a position and an orientation of a mobile device 100b.
Figure 4:
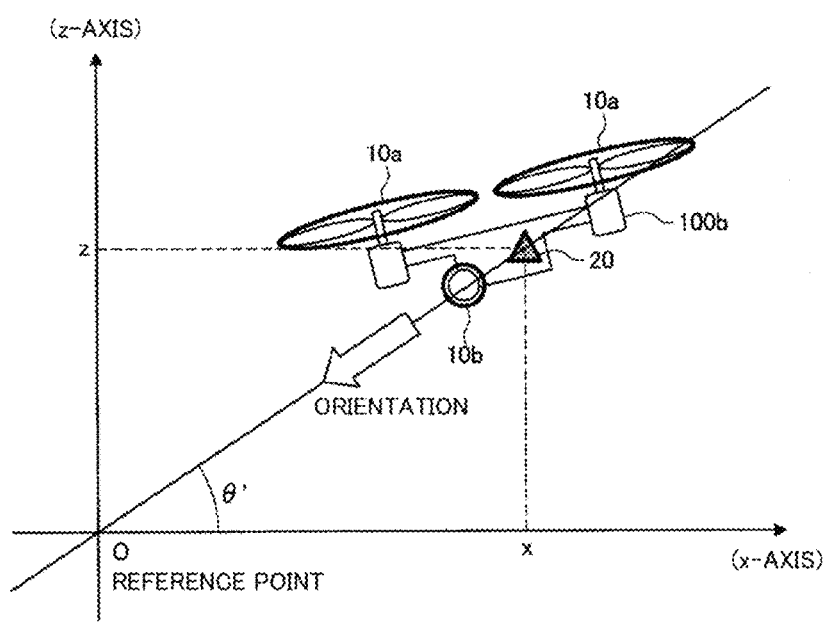
FIG. 4 is a diagram for illustrating the method of specifying the position and the orientation of the mobile device 100b.

Referring to FIGS. 3 and 4, a specific description will be given herein of the "position of the mobile device 100*b*" and the "positional coordinates of the mobile device 100*b*". FIG. 3 illustrates the mobile device 100*b* when viewed in a downward direction. Meanwhile, FIG. 4 illustrates the mobile device 100*b* when viewed in a lateral direction. The position specification unit 111*b* analyzes the imaging data generated by the imaging unit 130 to specify the feature domains 10 (a feature domain 10*a* of the propeller and a feature domain 10*b* of the camera in the example in FIGS. 3 and 4) determined in advance for each of the mobile devices 100*b* and specify the position of the gravity center 20 of the mobile device 100*b* in the imaging data based on the feature domains 10. When the mobile device 100*b* is an unknown tangible entity and the device specification unit 111*a* described above has specified the mobile device 100*b* through cooperation with an external device (such as, e.g., a server on the Internet) or the like, the position specification unit 111*b* may also acquire information (such as the positions or number of the feature domains 10 in the mobile device 100*b*) related to the feature domains 10 to be used in processing of specifying the position. When equipment to be provided in the mobile device 100*b* is determined under laws, regulations, and the like and the equipment corresponds to the feature domains 10, the position specification unit 111*b* may also specify the feature domains 10 based on the laws, regulations, and the like.

Then, the position specification unit 111*b* represents the position of the gravity center 20 in the imaging data by using the three-dimensional orthogonal coordinate system when the predetermined reference point is set to an origin to specify the "positional coordinates of the mobile device 100*b*". Specifically, the position specification unit 111*b* calculates each of the x-coordinate, the y-coordinate, and the z-coordinate in the three-dimensional orthogonal coordinate system, as illustrated in FIGS. 3 and 4. Note that the position of the reference point is not particularly limited. For example, the reference point may be set at a predetermined position in an airspace managed by the information processing system according to the present embodiment or may also be set at a predetermined spot immediately under the airspace. A definition of the "positional coordinates of the mobile device 100*b*" is not limited to the definition given above. For example, the "positional coordinates of the mobile device 100*b*" may also be coordinates represented by a three-dimensional oblique coordinate system when the predetermined reference point is set to the origin.

The above description explains that the position specification unit 111*b* specifies the positional coordinates of the local device based on the sensor data acquired by the positioning sensor, but a method of specifying the positional coordinates of the local device is not limited thereto. For example, when there is an external device (including another mobile device 100*b* or the like) the positional coordinates of which are specified, the position specification unit 111*b* may also specify the positional coordinates of the local device based on positional coordinates of the external device. More specifically, the position specification unit 111*b* analyzes imaging data resulting from imaging of the external device and recognizes a relative positional relationship between the local device and the external device based on a position of the external device in the imaging data. Then, the position specification unit 111*b* may also specify the positional coordinates of the local device in the three-dimensional space based on the positional coordinates of the device provided from the external device and on the relative positional relationship between the local device and the external device.

(Direction Specification Unit 111c)

The direction specification unit 111c is the functional configuration that functions as an acquisition unit that acquires the imaging data generated by the imaging unit 130 and analyzes the imaging data to specify the orientation of the mobile device 100b observed in the imaging data. More specifically, the direction specification unit 111c specifies, as the orientation of the mobile device 100b, at least one of the direction in which the mobile device 100b is moving, the direction in which the mobile device 100b is movable, and the direction in which the mobile device 100b is expected to move. Each of the direction in which the mobile device 100b is moving, the direction in which the mobile device 100b is movable, and the direction in which the mobile device 100b is expected to move may be either a two-dimensional direction or a three-dimensional direction. The "two-dimensional direction" mentioned herein may be, e.g., a direction in a substantially horizontal plane (an xy plane as illustrated in FIG. 3) or a direction in a substantially vertical plane (an xz plane as illustrated in FIG. 4), and is not necessarily limited thereto.

A more specific description will be given of the method of specifying the orientation of the mobile device 100b. The direction specification unit 111c specifies the orientation based on features of the mobile device 100b. For example, as illustrated in FIGS. 3 and 4, the direction specification unit 111c analyzes the imaging data to specify the feature domain 10b of the camera included in the mobile device 100b. Then, for example, the direction specification unit 111c calculates a straight line in a direction from the positional coordinates of the mobile device 100b (positional coordinates of the gravity center 20 of the mobile device 100b) specified by the position specification unit 111b toward a point (such as, e.g., a center point of the feature domain 10b of the camera) in the feature domain 10b of the camera, and determines that the direction is the orientation of the mobile device 100b.

Then, as illustrated in FIG. 3, the direction specification unit 111c specifies an angle θ formed between the x-axis and the calculated straight line in the xy plane to show the orientation of the mobile device 100b in the xy plane. In addition, as illustrated in FIG. 4, the direction specification unit 111c specifies an angle θ' formed between the x-axis and the calculated straight line in the xz plane to show the orientation of the mobile device 100b in the xz plane. Note that, when the direction specification unit 111c specifies a two-dimensional direction, either one of, e.g., the direction in the xy plane in FIG. 3 and the direction in the xz plane in FIG. 4 is specified and, when the direction specification unit 111c specifies a three-dimensional direction, the respective directions in the xy plane and the xz plane are specified.

Note that the method of specifying the orientation of the mobile device 100b is not limited to the method described above. For example, for the calculation of the straight line described above, the feature domain 10 other than the feature domain 10b of the camera may also be used, and a point other than the positional coordinates of the mobile device 100b (positional coordinates of the gravity center 20 of the mobile device 100b) may also be used. Alternatively, the direction specification unit 111c may also specify the orientation of the mobile device 100b merely based on positional relationships between the plurality of feature domains 10 without using the positional coordinates of the mobile device 100b to specify the three-dimensional direction.

Still alternatively, the direction specification unit 111c may also specify the orientation of the mobile device 100b by using a technique of machine learning such as a support vector machine or a neural network. For example, the direction specification unit 111c may also specify the orientation by generating a classifier through training performed using training data in which the feature domains 10 of the mobile device 100b are associated with the orientation thereof and inputting the feature domains 10 of the mobile device 100b to the classifier. Note that, with regard to the support vector machine, e.g., a plurality of the support vector machines are combined to build a support vector machine model for multi-class classification, and the training data is input to the model to generate the classifier. Meanwhile, with regard to the neural network, a multi-layer neural network is built, and the training data is input thereto to adjust parameters of the multi-layer neural network and thus generate the classifier. Alternatively, the direction specification unit 111c may also use an artificial intelligence (AI) or the like as the classifier to specify the orientation of the mobile device 100b. A detailed description will be given later of a variation of the method used by the direction specification unit 111c to specify the orientation.

(Prediction Unit 111d)

The prediction unit 111d is the functional configuration that predicts, based on the orientation and the position of the mobile device 100b, an orientation or a position (i.e., a migration path) of the mobile device 100b at a given future time point. More specifically, when the mobile device 100b is moving while being captured in the imaging data, the prediction unit 111d acquires respective orientations and positional coordinates of the mobile device 100b at a time point when t=t0 is satisfied and at a time point a unit time Δt later and calculates average rates of change thereof. The average rates of change of the orientations and the positional coordinates can be represented as tensors. The prediction unit 111d analyzes the tensors by a predetermined method and can thus predict the orientation or position of the mobile device 100b at the given future time point. The "predetermined method" includes, e.g., inputting the tensors to a machine learning (or an artificial intelligence) library capable of time series analysis of the tensors, but is not limited thereto. Note that the prediction unit 111d may also predict the orientations or positions of a plurality of the mobile devices 100b. Alternatively, the prediction unit 111d may also predict the orientation or position of the local device by using the method described above. More specifically, the prediction unit 111d may also analyze the average rates of change of the orientation and the positional coordinates of the local device, which are represented as the tensors, by a predetermined method to predict the orientation or position of the local device at the given future time point.

Figure 5:
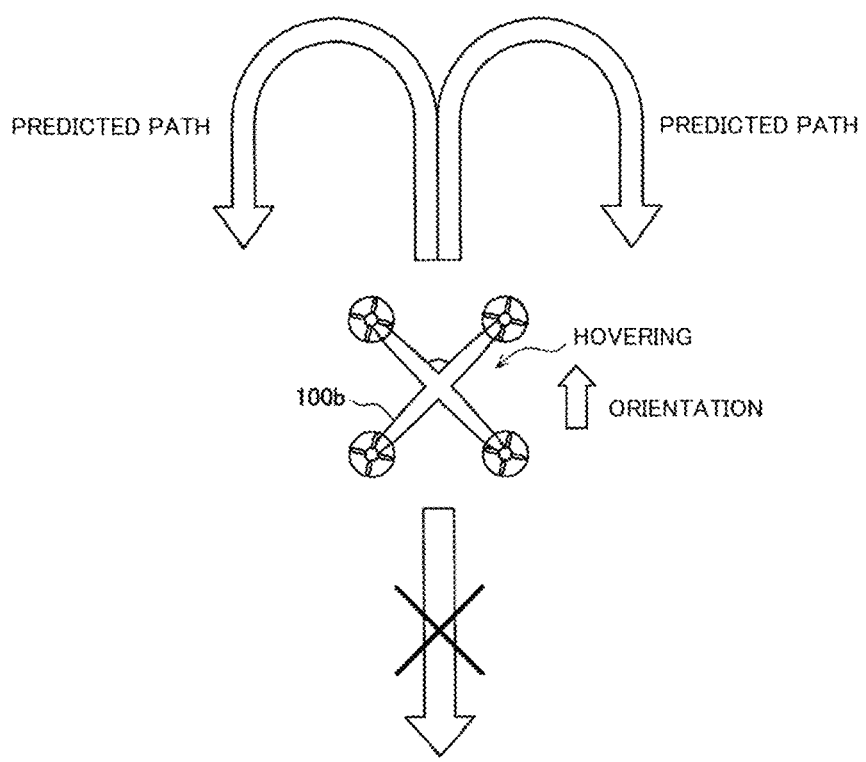
FIG. 5 is a diagram for illustrating prediction of the position and the orientation of the mobile device 100b.

By thus performing the prediction in consideration not only of the positional coordinates of the mobile device 100b, but also of the orientation thereof, the prediction unit 111d can implement high-accuracy prediction in a shorter period of time. For example, as illustrated in FIG. 5, when the mobile device 100b is hovering while being oriented in a given direction, the prediction unit 111d can eliminate a possibility that the mobile device 100b moves in a direction opposite to the orientation thereof and determine a path in the direction in which the mobile device 100b is oriented to be a predicted path of the mobile device 100b. Meanwhile, when prediction is performed based only on the positional coordinates of the mobile device 100b, the prediction unit 111d can neither eliminate the possibility that the mobile device 100b moves in the direction opposite to the orientation thereof nor perform high-accuracy prediction unless the mobile device 100b flies over a considerably long distance. Thus, the prediction unit 111d performs prediction in consideration not only of the positional coordinates of the mobile device 100b, but also of the orientation thereof, and can thus implement high-accuracy prediction in a shorter period of time.

(Movement Control Unit 112)

The movement control unit 112 is the functional configuration that controls movement (flight in the present embodiment) of the local device. For example, when the analysis unit 111 analyzes the imaging data generated by the imaging unit 130 or the various sensor data acquired by the sensor unit 140, the movement control unit 112 generates control information for controlling the moving mechanism 160 based on a result of the analysis and provides the information to the moving mechanism 160. For example, when an obstacle is detected in a direction of travel of the local device as a result of the analysis, the movement control unit 112 can control the collision avoidance flight based on a shape, an operation, or the like of the detected obstacle.

When the prediction unit 111d has predicted the orientation or position of the local device, the movement control unit 112 may also control the movement (flight) of the local device based on a result of the prediction. For example, when the prediction unit 111d predicts respective migration paths of the local device and the mobile device 100b and predicts that the local device and the mobile device 100b will collide with each other, the movement control unit 112 can implement the collision avoidance flight of the local device based on the result of the prediction. More specifically, the movement control unit 112 causes the prediction unit 111d to calculate a migration path of the local device which allows avoidance of the collision, and generates control information which causes the local device to move (fly) in accordance with the calculated migration path. Then, the movement control unit 112 provides the information to the moving mechanism 160 and can thus implement the collision avoidance flight of the local device.

Figure 6:
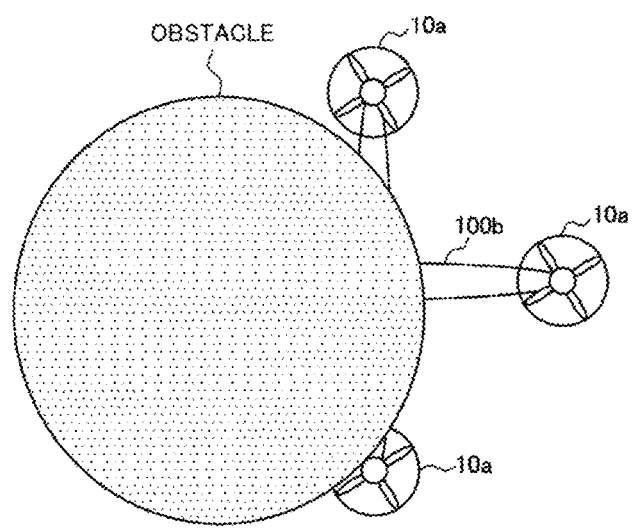
FIG. 6 is a diagram for illustrating control of movement (flight) of the mobile device 100a when feature domains 10 of the mobile device 100b are not clearly observed due to an obstacle.

In addition, the movement control unit 112 can control the movement (flight) of the local device so as to remove a factor which interrupts the specification of the orientation of the mobile device 100b (hereinafter the flight may be referred to also as the "obstacle avoidance flight"). For example, in such a case where imaging is performed in a backlit situation, where imaging of a shadowed region is performed, or where imaging is performed at a place where there are numerous obstacles, it may be possible that the feature domains 10 of the mobile device 100b are not clearly observed in the imaging data or hidden behind the obstacles. For example, as illustrated in FIG. 6, there is a case where a propeller portion and a camera portion serving as the feature domains 10 of the mobile device 100b may be entirely or partially hidden behind the obstacle ("obstacle" in FIG. 6 may also be a region where blown out highlight is caused by backlight or a shadowed region). In this case, the movement control unit 112 varies the position of the local device (movable device) in various directions such as a front/rear direction, a leftward/rightward direction, and an upward/downward direction until the feature domains 10 of the propeller portion and the camera portion, which are hidden behind the obstacle, are imaged. As a result, the movement control unit 112 allows easier detection of the feature domains 10 of the mobile device 100b to be used for processing, and therefore allows the accuracy of the analysis of the orientation of the mobile device 100b to be improved. Note that the control is only exemplary, and details of the control by the movement control unit 112 may be changed appropriately.

(Mobile Device Control Unit 113)

The mobile device control unit 113 is the functional configuration that controls the movement of the mobile device 100b based on the result of the prediction of the orientation or position of the mobile device 100b. For example, when the prediction unit 111d predicts the respective migration paths of the local device and the mobile device 100b and predicts that the local device and the mobile device 100b will collide with each other, the mobile device control unit 113 implements the collision avoidance flight of the mobile device 100b based on the result of the prediction. More specifically, the mobile device control unit 113 causes the prediction unit 111d to calculate a migration path of the mobile device 100b which allows avoidance of the collision, and generates control information which causes the mobile device 100b to move (fly) in accordance with the calculated migration path. Then, the mobile device control unit 113 provides the control information to the mobile device 100b via the communication unit 120 and can thus implement the collision avoidance flight of the mobile device 100b. Note that, in such a case where the collision can appropriately be avoided by the collision avoidance flight only of the local device, the mobile device control unit 113 need not be provided.

(Communication Unit 120)

The communication unit 120 is the functional configuration that performs communication with an external device. For example, the communication unit 120 transmits, to the mobile device 100b, the control information to be used to control the mobile device 100b. Note that details of the information transmitted by the communication unit 120 through communication are not limited thereto. For example, the communication unit 120 may also transmit, to the mobile device 100b, the result of the analysis (such as, e.g., the orientations and the positional coordinates of the local device and the mobile device 100b) by the analysis unit 111 of the local device or the like or conversely receive, from the mobile device 100b, the result of the analysis by the mobile device 100b or the like. This allows distributed processing to be implemented by the mobile device 100a and the mobile device 100b. A communication method to be used by the communication unit 120 for communication is not particularly limited.

(Imaging Unit 130)

The imaging unit 130 is the functional configuration that performs imaging processing to generate the imaging data (note that the imaging unit 130 may also be regarded as an acquisition unit that acquires the imaging data). More specifically, the imaging unit 130 images the mobile device 100b or an environment therearound to generate the imaging data. In particular, when the direction specification unit 111c specifies the three-dimensional direction in which the mobile device 100b is oriented, the imaging unit 130 is configured to be able to generate the imaging data (including also Depth data and the like) to be used to generate three-dimensional image data, such as, e.g., a stereo camera.

The "imaging data" generated by the imaging unit 130 is a concept including still image data, moving image data, or a measurement value which is not visualized as an image. The "imaging data" may also be acquired by an RGB camera or acquired by an image sensor capable of detecting light in a wavelength band other than those of RGB, such as an infrared camera.

The imaging unit 130 includes a lens system including an imaging lens, a diaphragm, a zoom lens, a focus lens, and the like, a drive system that causes the lens system to perform a focusing operation or a zooming operation, a solid-state imaging element array that performs photoelectric conversion of imaging light obtained by the lens system to generate an imaging signal, and the like. The solid-state imaging element array may also be implemented by, e.g., a CCD (Charge Coupled Device) sensor array or a CMOS (Complementary Metal Oxide Semiconductor) sensor array.

When the mobile device 100a is flyable as in the present embodiment, the imaging lens of the imaging unit 130 is disposed in a state where the imaging lens is oriented in a ground surface direction so as to be able to perform aerial photography. Note that the mode in which each of the members (such as the imaging lens) of the imaging unit 130 is disposed is not limited thereto. Each of the members of the imaging unit 130 may also be disposed in a mode in which an imaging direction is changeable.

(Sensor Unit 140)

The sensor unit 140 is the functional configuration that acquires the various sensor data related to an environment around the local device. For example, the sensor unit 140 includes the positioning sensor (such as the GNSS receiver or the atmospheric pressure sensor), a gyrosensor, an acceleration sensor, a geomagnetic sensor, a proximity sensor, a microphone, a temperature sensor (such as, e.g., a thermosensor), a humidity sensor, an illuminance sensor, a pressure sensor, an infrared sensor, and the like. Note that types of the sensors to be included in the sensor unit 140 are not limited thereto. The sensors included in the sensor unit 140 may be plural. It may also be possible that each of these sensors is provided in an external device other than the local device, and the various sensor data is acquired from the external device.

(Storage Unit 150)

The storage unit 150 is the functional configuration that stores various information. For example, the storage unit 150 stores information (information such as, e.g., the imaging data, the various sensor data, the feature values of the mobile device 100b, or the reference point) to be used for analysis processing by the analysis unit 111, information (such as, e.g., the orientation or positional coordinates of the mobile device 100b) output from the analysis unit 111, and the like. The storage unit 150 also stores programs, parameters, and the like to be used for processing by the individual functional configurations. Note that the information to be stored by the storage unit 150 is not limited thereto.

(Moving Mechanism 160)

The moving mechanism 160 is a mechanism for moving the local device (causing the local device to fly in the present embodiment) and includes, e.g., an actuator, a motor, a propeller, or the like. The moving mechanism 160 drives the local device based on the control information provided by the movement control unit 112 to move (fly).

The description has been given heretofore of the example of the functional configurations of each of the mobile devices 100 (the mobile device 100a in the example in FIG. 2). Note that the functional configurations described above using FIG. 2 are only exemplary, and the functional configurations of the mobile device 100a are not limited to those in such an example. More specifically, the mobile device 100a need not necessarily include all the configurations illustrated in FIG. 2. In addition, the functional configurations of the mobile device 100a can flexibly be modified depending on specifications and operation.

Meanwhile, the mobile device 100b (i.e., the device having the orientation and the positional coordinates to be specified by the mobile device 100a) need not necessarily include the same functional configurations as those of the mobile device 100a. More specifically, the mobile device 100b need not necessarily include the same functional configurations as those of the mobile device 100a as long as the mobile device 100a has features sufficient to allow the orientation of the mobile device 100b to be specified.

1.3. Example of Flows of Processing

The description has been given of the example of the functional configurations of each of the mobile devices 100. Subsequently, a description will be given of an example of flows of processing by the mobile device 100.

(Flow of Processing of Specifying Orientation and Positional Coordinates of Mobile device 100b)

Figure 7:
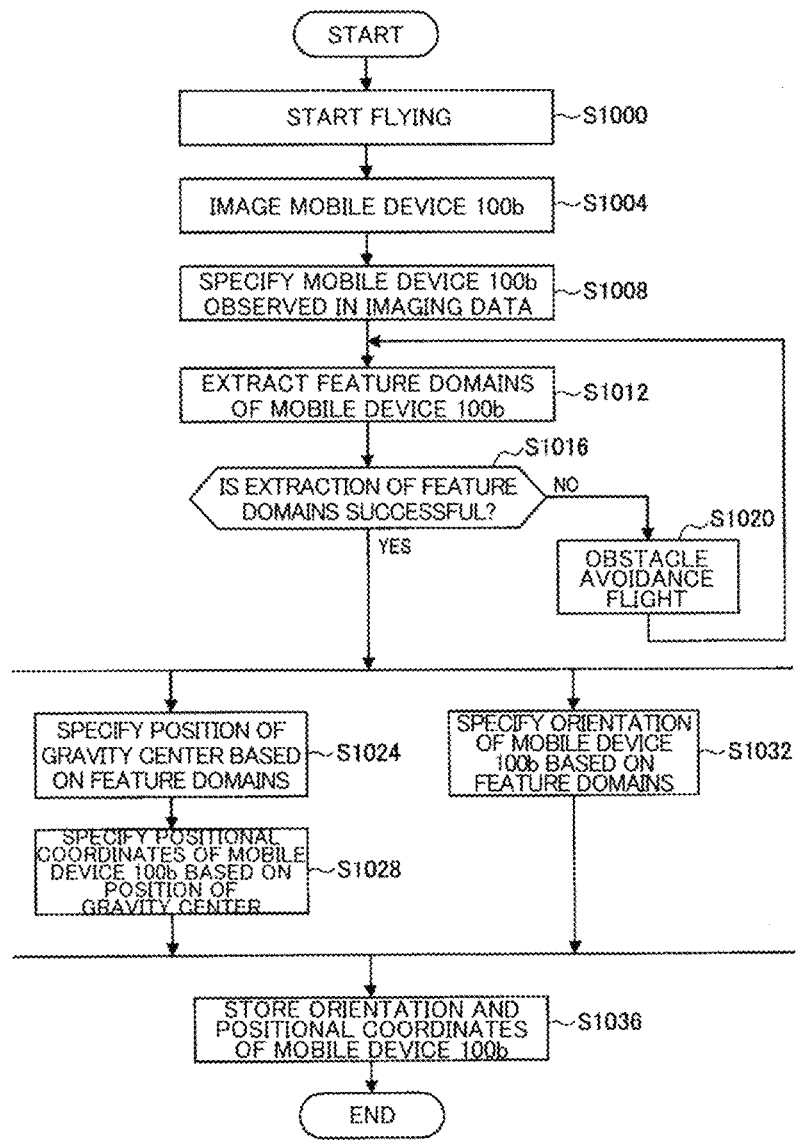

First, referring to FIG. 7, a description will be given of a flow of processing in which the orientation and the positional coordinates of the mobile device 100b are specified by the mobile device 100a.

In step S1000, the mobile device 100a starts flying based on the control by the movement control unit 112. In step S1004, the imaging unit 130 images the mobile device 100b to generate the imaging data. In step S1008, the device specification unit 111a analyzes the imaging data to specify the mobile device 100b observed in the imaging data.

In step S1012, the position specification unit 111b and the direction specification unit 111c analyze the imaging data to attempt to extract the feature domains 10 (such as, e.g., the propeller portion and the camera portion) of the mobile device 100b. When the extraction of the feature domains 10 of the mobile device 100b is unsuccessful (No in step S1016), in step S1020, the movement control unit 112 implements the obstacle avoidance flight. For example, the movement control unit 112 varies the position of the local device (movable device) in various directions such as the front/rear direction, the leftward/rightward direction, and the upward/downward direction) to attempt to extract the feature domains 10 of the mobile device 100b (step S1020).

When the extraction of the feature domains 10 of the mobile device 100b is successful (Yes in step S1016), in step S1024, the position specification unit 111b specifies the position of the gravity center 20 of the mobile device 100b in the imaging data based on the feature domains 10 of the mobile device 100b. In step S1028, the position specification unit 111b specifies the positional coordinates of the mobile device 100b based on the position of the gravity center 20 of the mobile device 100b in the imaging data. More specifically, the position specification unit 111b represents the position of the gravity center 20 of the mobile device 100b in the imaging data by using the three-dimensional orthogonal coordinate system when the predetermined reference point is set to the origin to specify the positional coordinates of the mobile device 100b.

In parallel with the processing of specifying the positional coordinates of the mobile device 100b, in step S1032, the direction specification unit 111c specifies the orientation of the mobile device 100b based on the feature domains 10 of the mobile device 100b. For example, the direction specification unit 111c calculates the straight line in the direction from the positional coordinates (positional coordinates of the gravity center 20 of the mobile device 100b) of the mobile device 100b specified by the position specification unit 111b toward the point (such as, e.g., the center point of the feature domain 10b of the camera) in the feature domain 10b of the camera and specifies the direction as the orientation of the mobile device 100b or specifies the orientation of the mobile device 100b merely based on the positional relationships between the plurality of feature domains 10.

Then, in step S1036, the storage unit 150 stores the orientation and the positional coordinates of the mobile device 100b, whereby a sequence of processing is ended. While flying, the mobile device 100a repeats the processing described with reference to FIG. 7 to store (update) the respective orientations and the positional coordinates of one or more mobile devices 100b. Note that, when the mobile device 100a cannot specify at least either one of the orientation and the positional coordinates of the mobile device 100b, the mobile device 100a may also store (update) the other thereof.

(Flow of Processing Related to Collision Avoidance Flight)

Figure 8:
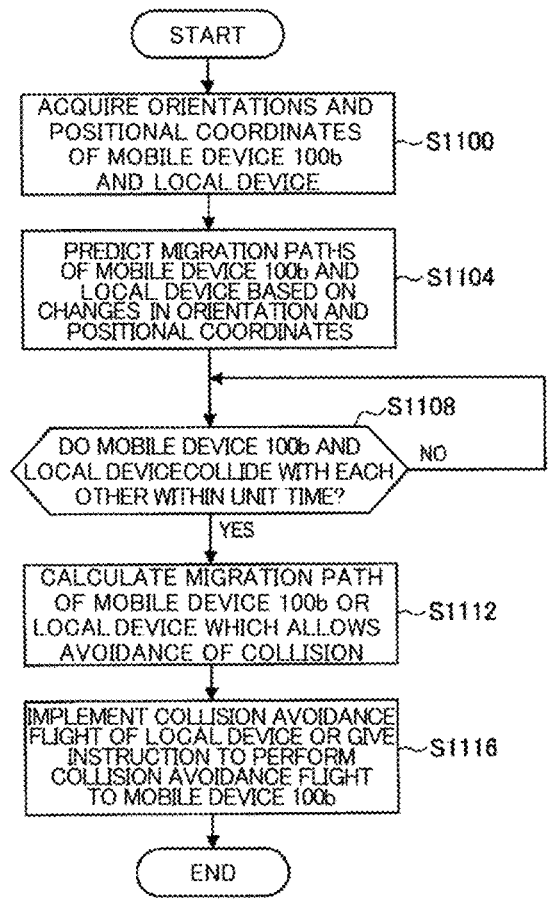
FIG. 8 is a flow chart illustrating an example of a flow of processing related to a collision avoidance flight to be performed by the mobile device 100a when avoiding a collision with the mobile device 100b.

Subsequently, referring to FIG. 8, a description will be given of an example of a flow of processing related to the collision avoidance flight when the mobile device 100a as the local device avoids a collision with the mobile device 100b.

In step S1100, the prediction unit 111d of the mobile device 100a acquires, from the storage unit 150, the respective orientations and the respective positional coordinates of the mobile device 100b and the local device. In step S1104, the prediction unit 111d predicts the respective migration paths of the mobile device 100b and the local device based on changes in the orientations and the positional coordinates of the mobile device 100b and the local device.

Then, when the prediction unit 111d predicts that the mobile device 100b and the local device will collide with each other within the unit time Δt based on the result of the prediction of the migration paths (Yes in step S1108), in step S1112, the prediction unit 111d calculates a migration path of the mobile device 100b or the local device which allows avoidance of the collision. In step S1116, in accordance with the migration path calculated by the prediction unit 111d, the movement control unit 112 implements the collision avoidance flight of the local device or the mobile device control unit 113 gives, to the mobile device 100b, an instruction to perform the collision avoidance flight (in other words, the mobile device control unit 113 provides control information which gives, to the mobile device 100b, an instruction to perform the collision avoidance flight). While flying, the mobile device 100a repeats the processing described with reference to FIG. 8 to avoid the collision between the local device and the mobile device 100b.

Figure 9:
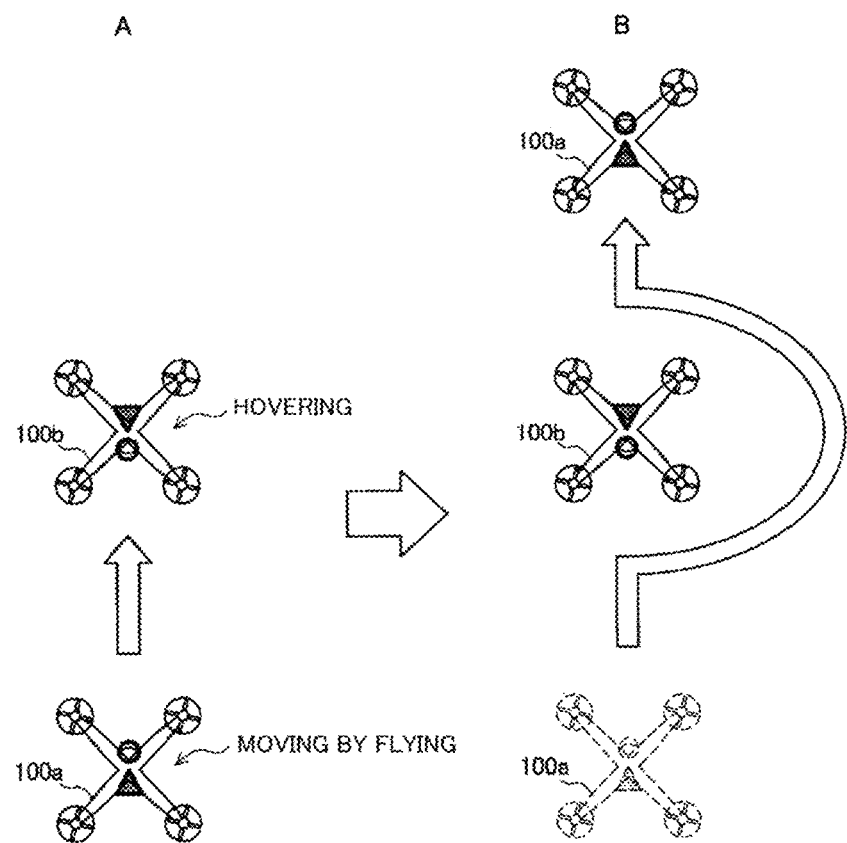
FIG. 9 is a diagram illustrating a specific example of the collision avoidance flight to be performed by the mobile device 100a when avoiding the collision with the mobile device 100b.

By the processing described with reference to FIG. 8, the collision between the mobile device 100a and the mobile device 100b in various situations is avoided. For example, as illustrated in A of FIG. 9, when the mobile device 100a is moving by flying and the mobile device 100b is hovering, the mobile device 100a can perform the collision avoidance flight by the local device based on changes in the orientations and the positional coordinates of the mobile device 100b and the local device, as illustrated in B of FIG. 9.

Figure 10:
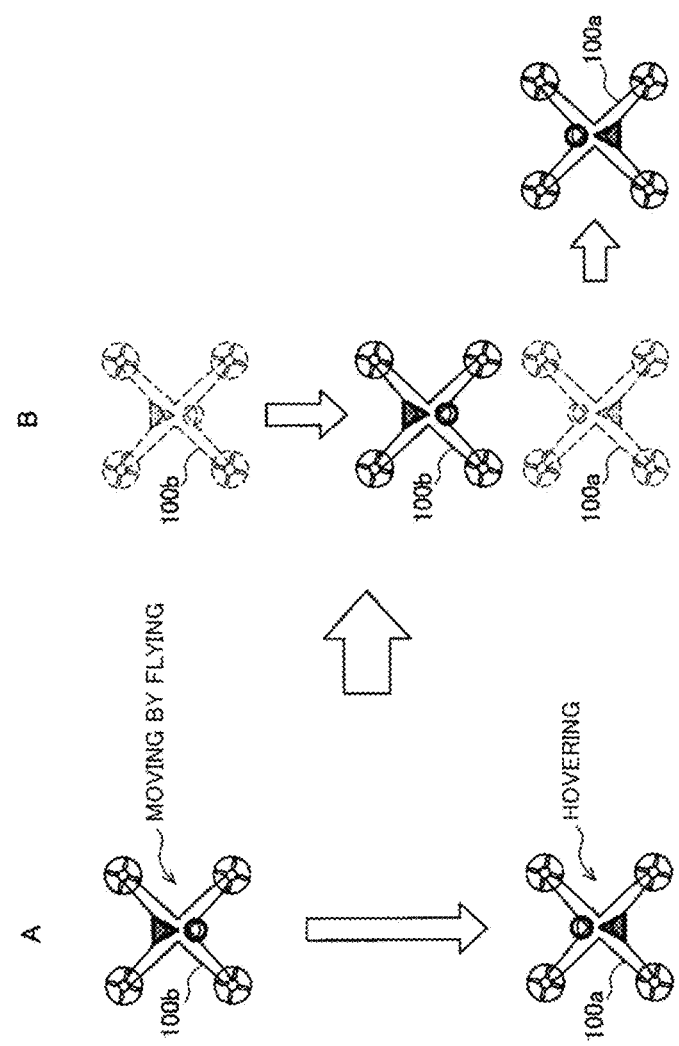
FIG. 10 is a diagram illustrating the specific example of the collision avoidance flight to be performed by the mobile device 100a when avoiding the collision with the mobile device 100b.

As illustrated in A of FIG. 10, when the mobile device 100a is hovering and the mobile device 100b is moving by flying, the mobile device 100a can perform the collision avoidance flight by the local device based on changes in the orientations and the positional coordinates of the mobile device 100b and the local device, as illustrated in B of FIG. 10.

Figure 11:
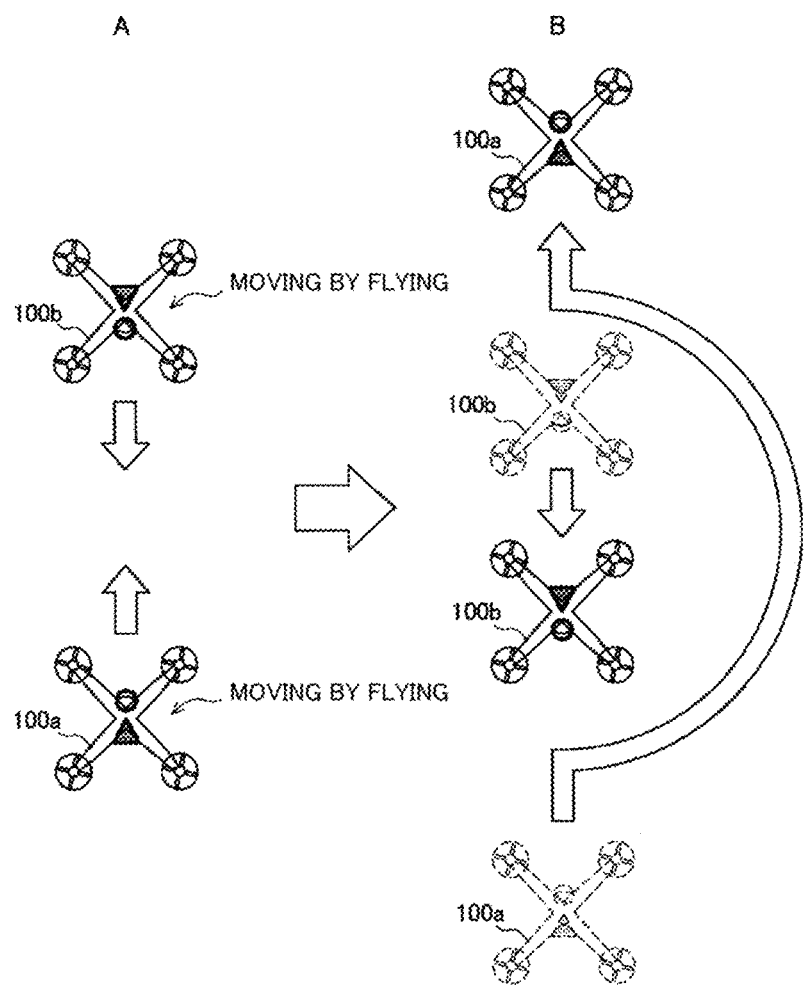
FIG. 11 is a diagram illustrating the specific example of the collision avoidance flight to be performed by the mobile device 100a when avoiding the collision with the mobile device 100b.

As illustrated in A of FIG. 11, when each of the mobile device 100a and the mobile device 100b is moving by flying, the mobile device 100a can perform the collision avoidance flight by the local device based on changes in the orientations and the positional coordinates of the mobile device 100b and the local device, as illustrated in B of FIG. 11. Needless to say, in FIGS. 9 to 11, the mobile device 100b may also perform the collision avoidance flight based on control thereof or control of the mobile device 100a.

2. Second Embodiment 2.1. Example of System Configuration

The description has been given above of the first embodiment of the present disclosure. Subsequently, a description will be given of the second embodiment of the present disclosure.

Figure 12:
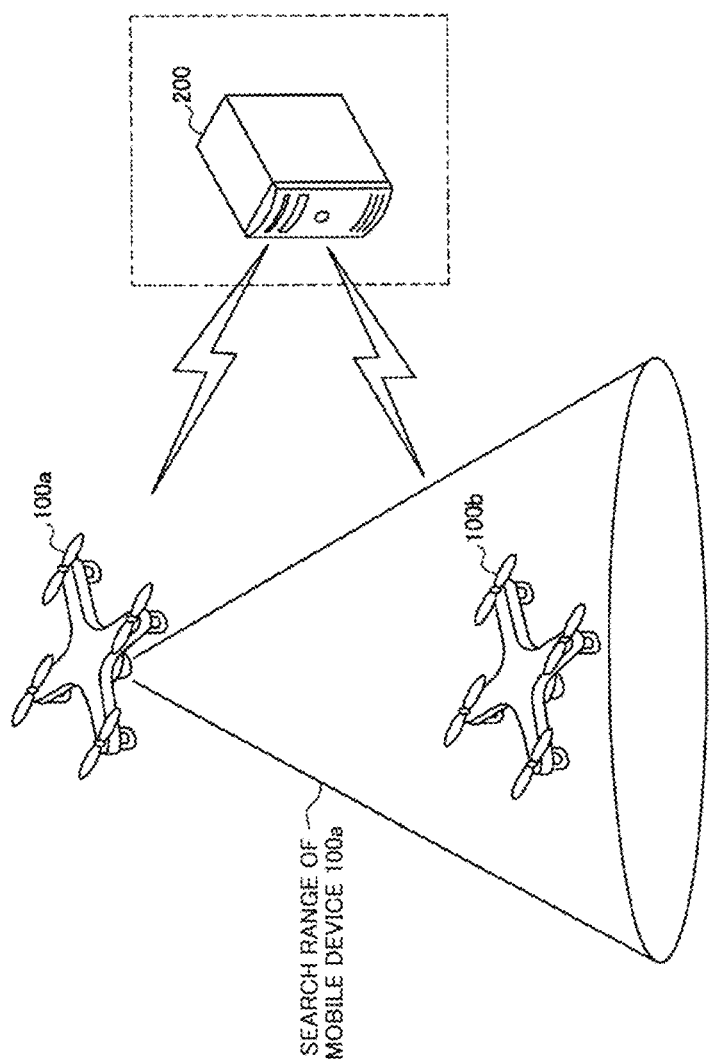
FIG. 12 is a diagram illustrating an example of a system configuration of an information processing system according to a second embodiment of the present disclosure.

FIG. 12 is a diagram illustrating an example of a system configuration according to the second embodiment. As illustrated in FIG. 12, the information processing system according to the second embodiment includes the mobile devices 100 (the mobile device 100a and the mobile device 100b in an example in FIG. 12) which are devices capable of unmanned flights and a flight control device 200. In the first embodiment, the mobile devices 100 autonomously fly but, in the second embodiment, each of the mobile devices 100 performs communication with the flight control device 200 in a predetermined airspace to fly under the control of the flight control device 200. Note that, in FIG. 12, the flight control device 200 performs communication with each of the mobile device 100a and the mobile device 100b to control the flights of the mobile device 100a and the mobile device 100b. However, the flight control device 200 may also perform communication with either one of the mobile device 100a and the mobile device 100b and control the flight of either one of the mobile device 100a and the mobile device 100b.

Note that, in the second embodiment, the flight control device 200 analyzes the imaging data generated by the imaging unit 130 provided in each of the mobile devices 100 (external devices) as movable devices to control the flight of the mobile device 100. Note that a type of the flight control device 200 is not particularly limited.

2.2. Example of Functional Configurations of Mobile Device 100

Figure 13:
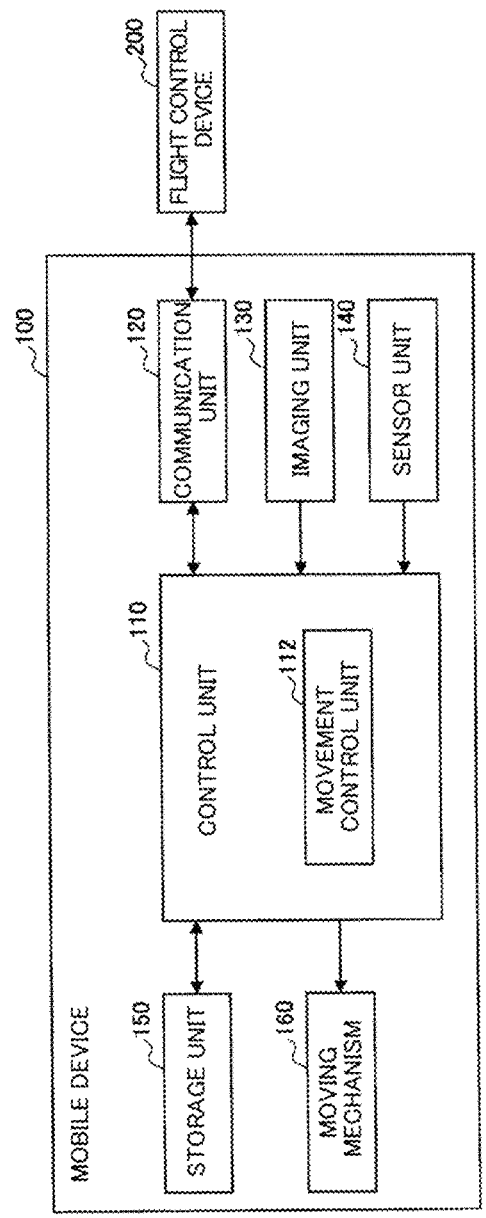
FIG. 13 is a block diagram illustrating an example of functional configurations of a mobile device 100.

The description has been given above of the example of the system configuration of the information processing system according to the second embodiment. Subsequently, referring to FIG. 13, a description will be given of an example of functional configurations of each of the mobile devices 100 (the mobile device 100a or the mobile device 100b) according to the second embodiment. FIG. 13 is a block diagram illustrating the example of the functional configurations of the mobile device 100 according to the second embodiment.

In the second embodiment, in the predetermined airspace, the flight control device 200 controls the flight of the mobile device 100. Accordingly, as can be seen from a comparison between FIGS. 2 and 13, the mobile device 100 according to the second embodiment need not include the analysis unit 111 (including the device specification unit 111a, the position specification unit 111b, the direction specification unit 111c, and the prediction unit 111d) and the mobile device control unit 113 (these functional configurations are provided in the flight control device 200 in the second embodiment).

The communication unit 120 transmits, to the flight control device 200, the imaging data generated by the imaging unit 130 and the various sensor data acquired by the sensor unit 140 and receives, from the flight control device 200, various information (such as, e.g., the control information) generated based on analysis of such data. The movement control unit 112 provides the control information received from the flight control device 200 to the moving mechanism 160 to control the movement (flight) of the local device. Note that the other functional configurations are the same as the functional configurations according to the first embodiment described above, and therefore a description thereof is omitted.

2.3. Example of Functional Configurations of Flight Control Device 200

Figure 14:
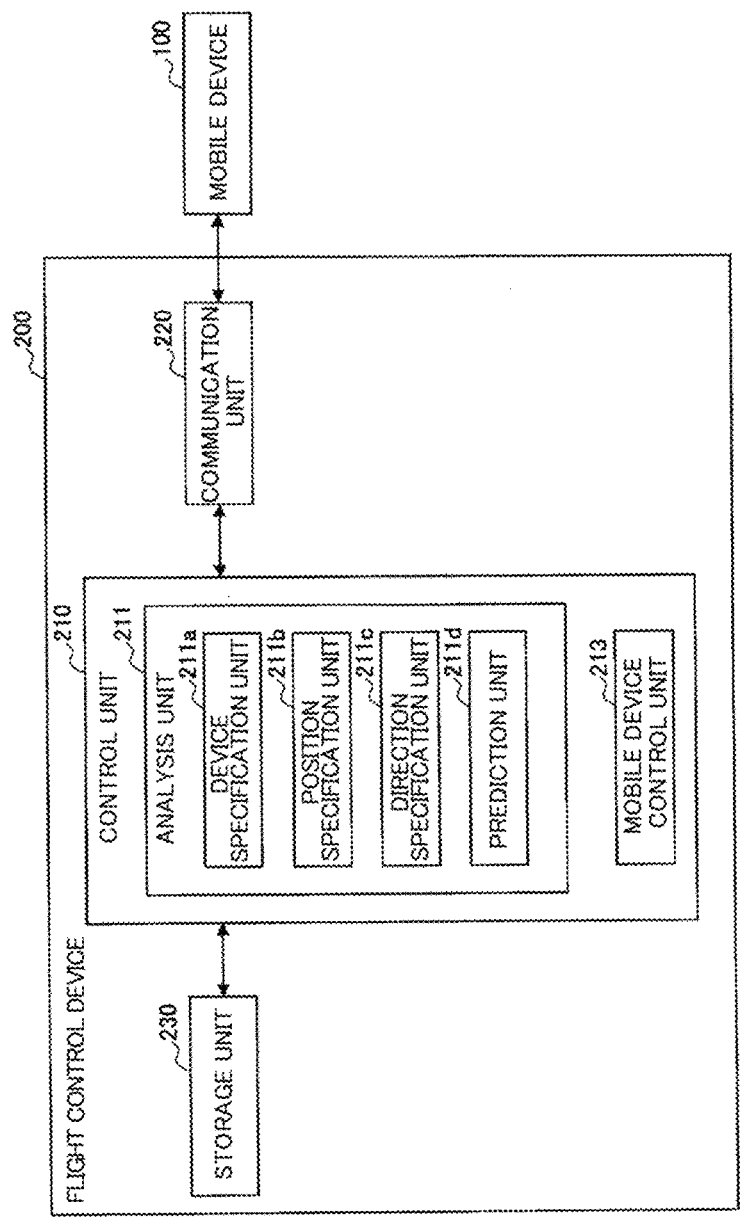
FIG. 14 is a block diagram illustrating an example of functional configurations of a flight control device 200.

Subsequently, referring to FIG. 14, a description will be given of an example of functional configurations of the flight control device 200 according to the second embodiment. FIG. 14 is a block diagram illustrating the example of the functional configurations of the flight control device 200 according to the second embodiment.

As illustrated in FIG. 14, the flight control device 200 includes a control unit 210, a communication unit 220, and a storage unit 230.

(Control Unit 210)

The control unit 210 is the functional configuration that generally controls general processing to be performed by the flight control device 200. For example, the control unit 210 can control starting and stopping of each of the functional configurations. Note that details of the control by the control unit 210 are not particularly limited. For example, the control unit 210 may also control processing (such as, e.g., processing by an OS) generally performed in various servers, versatile computers, PCs, tablet PCs, or the like.

As illustrated in FIG. 14, the control unit 210 includes an analysis unit 211 (including a device specification unit 211a, a position specification unit 211b, a direction specification unit 211c, and a prediction unit 211d) and a mobile device control unit 213. These functional configurations may be the same as those of the analysis unit 111 (including the device specification unit 111a, the position specification unit 111b, the direction specification unit 111c, and the prediction unit 111d) and the mobile device control unit 113 included in each of the mobile devices 100 according to the first embodiment, and therefore a description thereof is omitted. Specifically, the analysis unit 211 analyzes imaging data provided by each of the mobile devices 100 and the like to specify the orientation or positional coordinates of the mobile device 100 and predict the orientation or positional coordinates (i.e., migration path) of the mobile device 100 at a given future time point. Then, the mobile device control unit 213 generates, based on a result of the prediction of the orientation or positional coordinates of the mobile device 100, the control information for controlling the movement (flight) of the mobile device 100.

(Communication Unit 220)

The communication unit 220 is a functional configuration that performs communication with an external device. For example, the communication unit 220 receives, from the mobile device 100, the imaging data and the various sensor data each acquired by the mobile device 100. Then, the communication unit 220 transmits, to the mobile device 100, the control information generated by the mobile device control unit 213. Note that details of the information transmitted by the communication unit 220 through communication is not limited thereto. Also, a communication method to be used by the communication unit 220 for communication is not particularly limited.

(Storage Unit 230)

The storage unit 230 is the functional configuration that stores various information. For example, the storage unit 230 stores information (information such as, e.g., the imaging data, the various sensor data, the feature values of each of the mobile devices 100, or the reference point) to be used by the analysis unit 211 for analysis processing, information (such as, e.g., the orientation or positional coordinates of each of the mobile devices 100) output by the analysis unit 211, and the like. The storage unit 230 also stores programs, parameters, and the like to be used by the individual functional configurations for processing. Note that the information to be stored in the storage unit 230 is not limited thereto.

The description has been given heretofore of the example of the functional configurations of each of the mobile devices 100 and the flight control device 200 according to the second embodiment. Note that the functional configurations described above using FIGS. 13 and 14 are only exemplary, and the functional configurations of the mobile device 100 and the flight control device 200 according to the second embodiment are not limited to those in such an example. More specifically, the mobile device 100 and the flight control device 200 according to the second embodiment need not necessarily include all the configurations illustrated in FIGS. 13 and 14. Alternatively, any of the functions of the mobile device 100 may also be implemented by the flight control device 200 or, conversely, any of the functions of the flight control device 200 may also be implemented by the mobile device 100. Thus, the functional configurations of the mobile device 100 and the flight control device 200 according to the second embodiment can flexibly be modified depending on specifications and operation.

2.4. Example of Flows of Processing

The description has been given above of the example of the functional configurations of each of the mobile devices 100 and the flight control device 200 according to the second embodiment. Subsequently, a description will be given of an example of flows of processing by the mobile device 100 and the flight control device 200 according to the second embodiment.

(Flow of Processing of Specifying Orientation and Positional Coordinates of Mobile Device 100b)

Figure 15:
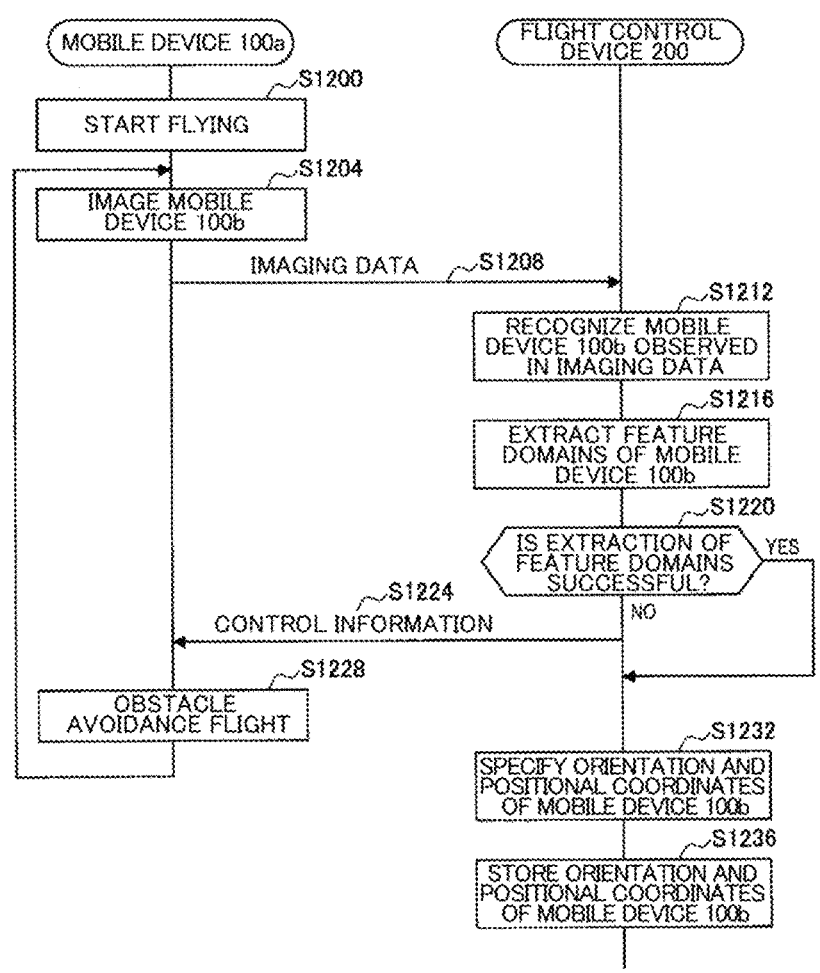
FIG. 15 is a flow chart illustrating an example of a flow of processing in which the position and the orientation of the mobile device 100b are specified by the flight control device 200.

First, referring to FIG. 15, a description will be given of the flow of processing in which the orientation and the positional coordinates of the mobile device 100b are specified by the flight control device 200.

In step S1200, the mobile device 100a starts flying based on the control by the movement control unit 112. In step S1204, the imaging unit 130 images the mobile device 100b to generate the imaging data. In step S1208, the communication unit 120 transmits the imaging data to the flight control device 200. In step S1212, the device specification unit 211a of the flight control device 200 analyzes the imaging data to specify the mobile device 100b observed in the imaging data.

In step S1216, the position specification unit 211b and the direction specification unit 211c analyze the imaging data to attempt to extract the feature domains 10 (such as, e.g., the propeller portion and the camera portion) of the mobile device 100b. When the extraction of the feature domains 10 of the mobile device 100b is unsuccessful (No in step S1220), in step S1224, the mobile device control unit 213 generates control information for controlling a flight of the mobile device 100a and a communication unit 220 transmits the control information to the mobile device 100a. In step S1228, the movement control unit 112 of the mobile device 100a uses the control information to implement the obstacle avoidance flight. For example, the movement control unit 112 varies the position of the local device (movable device) in various directions such as the front/rear direction, the leftward/rightward direction, and the upward/downward direction) to attempt to extract the feature domains 10 of the mobile device 100b (step S1228).

When the extraction of the feature domains 10 of the mobile device 100b is successful (Yes in step S1220), in step S1232, the position specification unit 211b and the direction specification unit 211c of the flight control device 200 specify the orientation and the positional coordinates of the mobile device 100b. More specifically, the position specification unit 211b specifies the position of the gravity center 20 of the mobile device 100b in the imaging data based on the feature domains 10 of the mobile device 100b and represents the position by using the three-dimensional orthogonal coordinate system when the predetermined reference point is set to the origin to specify the positional coordinates of the mobile device 100b. Then, the direction specification unit 211c calculates the straight line in the direction from the positional coordinates (positional coordinates of the gravity center 20 of the mobile device 100b) of the mobile device 100b specified by the position specification unit 111b toward the point (such as, e.g., the center point of the feature domain 10b of the camera) in the feature domain 10b of the camera and specifies the direction as the orientation of the mobile device 100b or specifies the orientation of the mobile device 100b based only on positional relationships between the plurality of feature domains 10.

Then, in step S1236, the storage unit 230 stores the orientation and the positional coordinates of the mobile device 100b, whereby a sequence of processing is ended. During the flight of the mobile device 100a, the flight control device 200 repeats the processing described with reference to FIG. 15 to store (update) the respective orientations and the positional coordinates of one or more mobile devices 100b. Note that, when the flight control device 200 cannot specify either one of the orientation and the positional coordinates of the mobile device 100b, the flight control device 200 may also store (update) the other thereof.

(Flow of Processing Related to Collision Avoidance Flight)

Figure 16:
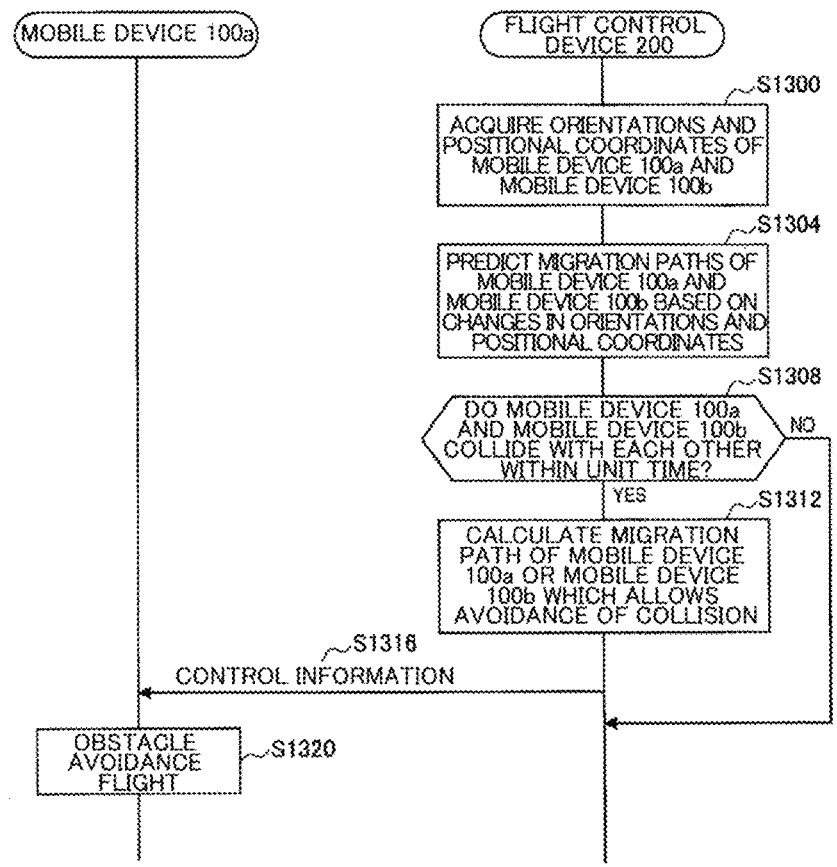
FIG. 16 is a flow chart illustrating an example of a flow of processing related to the collision avoidance flight to be performed by the flight control device 200 when avoiding a collision between the mobile device 100a and the mobile device 100b.

Subsequently, referring to FIG. 16, a description will be given of an example of a flow of processing related to the collision avoidance flight when a collision between the mobile device 100a and the mobile device 100b is to be avoided.

In step S1300, the prediction unit 211d of the flight control device 200 acquires, from the storage unit 230, the respective orientations and the respective positional coordinates of the mobile device 100a and the mobile device 100b. In step S1304, the prediction unit 111d predicts the respective migration paths of the mobile device 100a and the mobile device 100b based on changes in the orientations and the positional coordinates of the mobile device 100a and the mobile device 100b.

Then, when the prediction unit 111d predicts that the mobile device 100a and the mobile device 100b will collide with each other within the unit time Δt based on the result of the prediction of the migration paths (Yes in step S1308), in step S1312, the prediction unit 111d calculates a migration path of the mobile device 100a or the mobile device 100b which allows avoidance of the collision. In step S1316, the mobile device control unit 213 generates control information for controlling, e.g., the flight of the mobile device 100a, and the communication unit 220 transmits the control information to the mobile device 100a. In step S1320, the movement control unit 112 of the mobile device 100a implements the collision avoidance flight using the control information, whereby a sequence of processing is ended.

Note that the flight control device 200 may also implement the collision avoidance flight using not the mobile device 100a, but the mobile device 100b. While the mobile device 100a and the mobile device 100b are flying, the flight control device 200 repeats the processing described with reference to FIG. 16 to avoid the collision therebetween.

3. Modifications 3.1. Variation of Mobile Device 100

The description has been given above of the second embodiment of the present disclosure. Subsequently, a description will be given of a variation of each of the mobile devices 100 as a modification according to the present disclosure. Note that a description will be given below by way of example of a case where the modification is applied to the configurations in the first embodiment. For example, it is assumed that the specification of the positional coordinates and the orientation is implemented by the position specification unit 111b and the direction specification unit 111c of the mobile device 100. Needless to say, the modification may also be applied to the configurations in the second embodiment.

Figure 17:
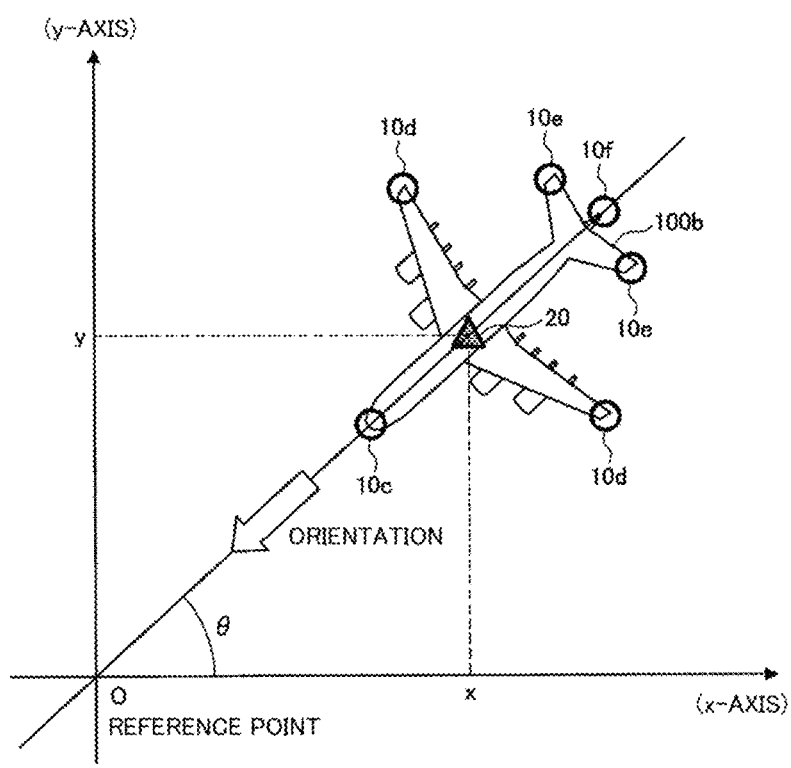
FIG. 17 is a diagram for illustrating a method of specifying a position and an orientation of an airplane as a type of the mobile device 100.
Figure 18:
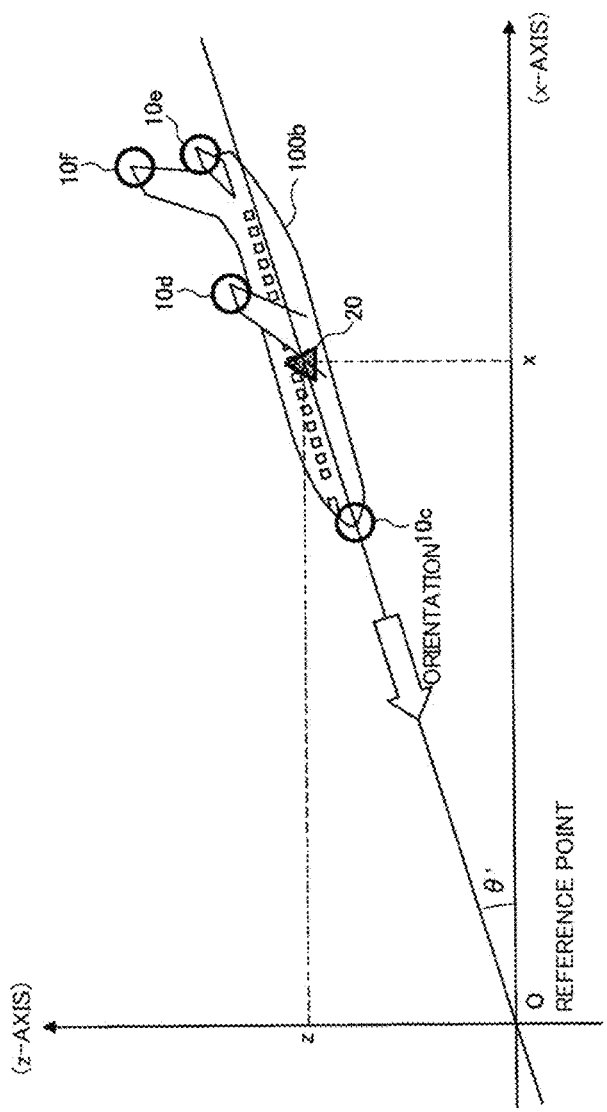
FIG. 18 is a diagram for illustrating the method of specifying the position and the orientation of the airplane as a type of the mobile device 100.

In the embodiment described above, the mobile device 100, which is the flyable multicopter type device, is used by way of example, but the mobile device 100 may also be a flyable device other than the multicopter type. For example, as illustrated in FIGS. 17 and 18, the mobile device 100 may also be an airplane. At this time, as illustrated in FIGS. 17 and 18, the position specification unit 111b and the direction specification unit 111c of the mobile device 100a can specify, based on a feature domain 10c in a nose, feature domains 10d in a main wing, feature domains 10e in a horizontal tail, and a feature domain 10f in a vertical tail, the positional coordinates of the mobile device 100b (the gravity center 20 of the mobile device 100b) and the orientation thereof (the angle θ in the xy plane illustrated in FIG. 17 and the angle θ' in the xz plane illustrated in FIG. 18).

Figure 19:
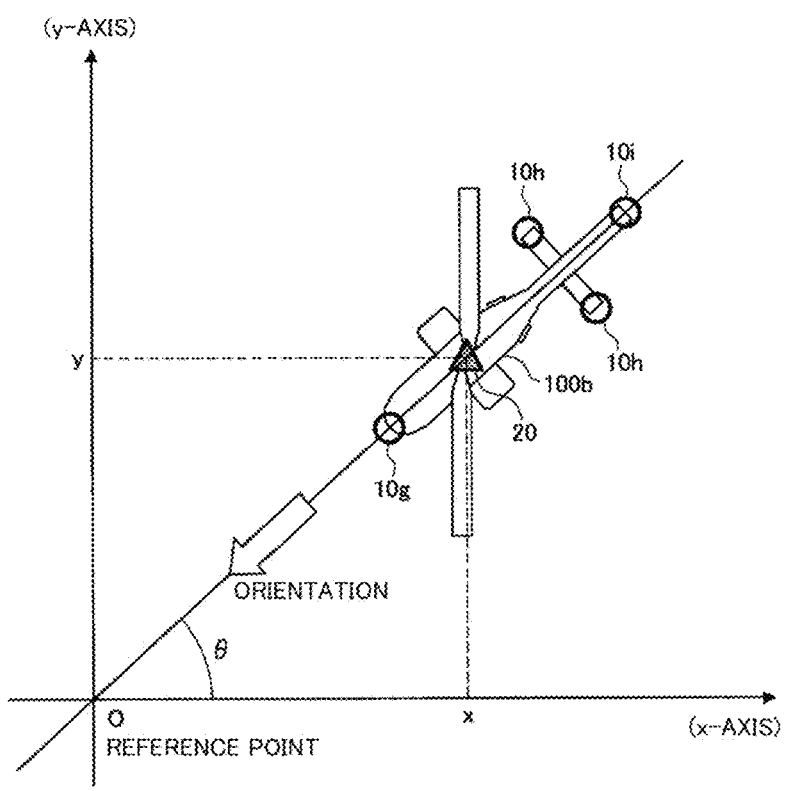
FIG. 19 is a diagram for illustrating a method of specifying a position and an orientation of a helicopter as a type of the mobile device 100.
Figure 20:
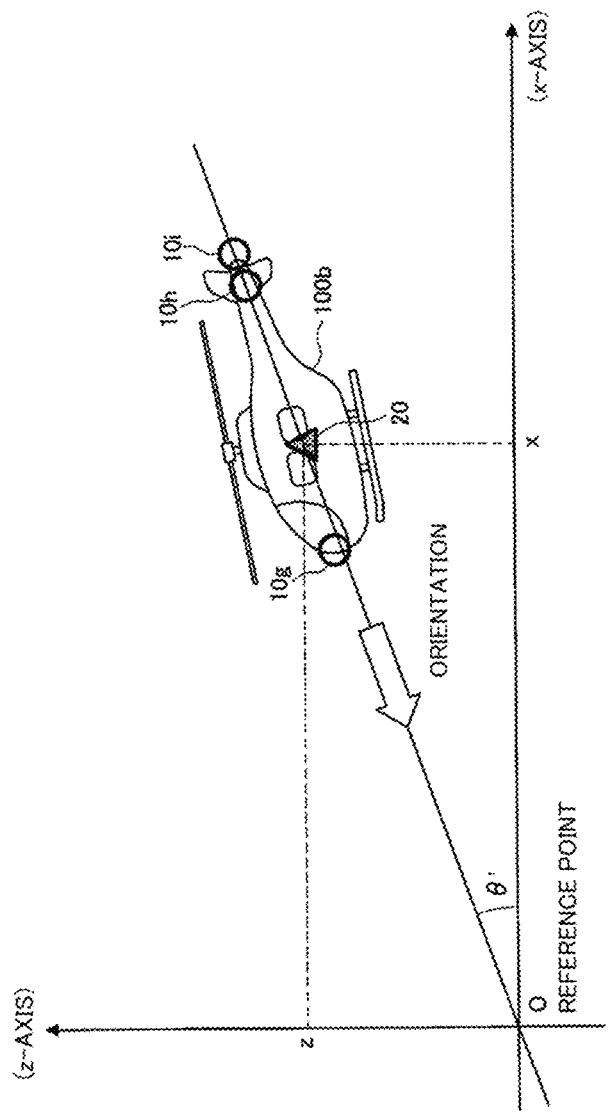
FIG. 20 is a diagram for illustrating the method of specifying the position and the orientation of the helicopter as a type of the mobile device 100.

As also illustrated in FIGS. 19 and 20, the mobile device 100 may also be a helicopter. At this time, as illustrated in FIGS. 19 and 20, the position specification unit 111b and the direction specification unit 111c of the mobile device 100a can specify, based on a feature domain 10g in the nose, feature domains 10h in the horizontal tail, and a feature domain 10i in the vertical tail, the positional coordinates of the mobile device 100b (the gravity center 20 of the mobile device 100b) and the orientation thereof (the angle θ in the xy plane illustrated in FIG. 19 and the angle θ' in the xz plane illustrated in FIG. 20).

Figure 21:
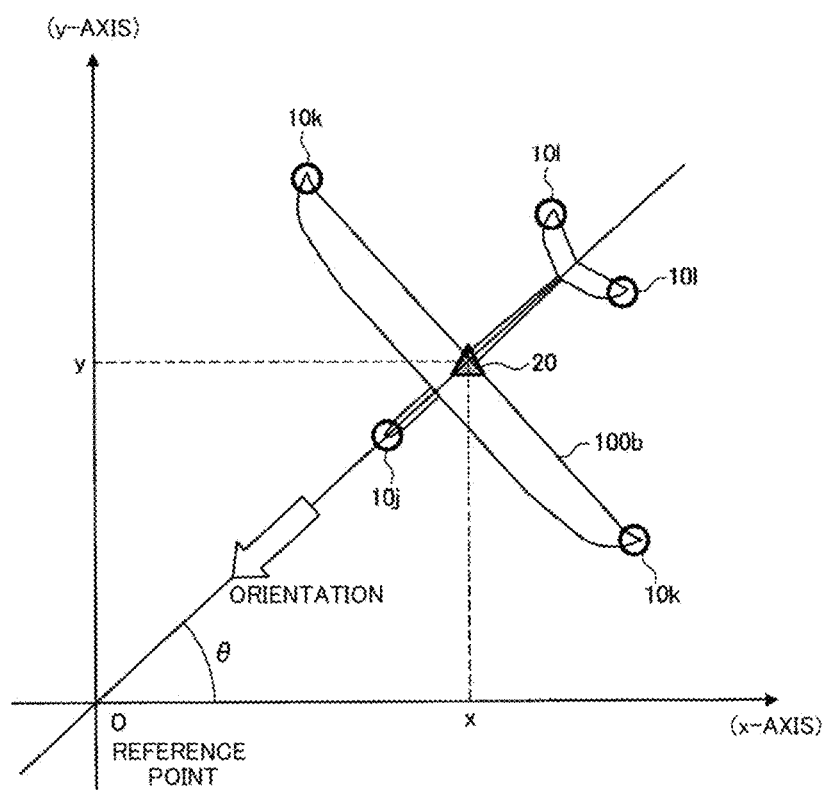
FIG. 21 is a diagram for illustrating a method of specifying a position and an orientation of a glider as a type of the mobile device 100.
Figure 22:
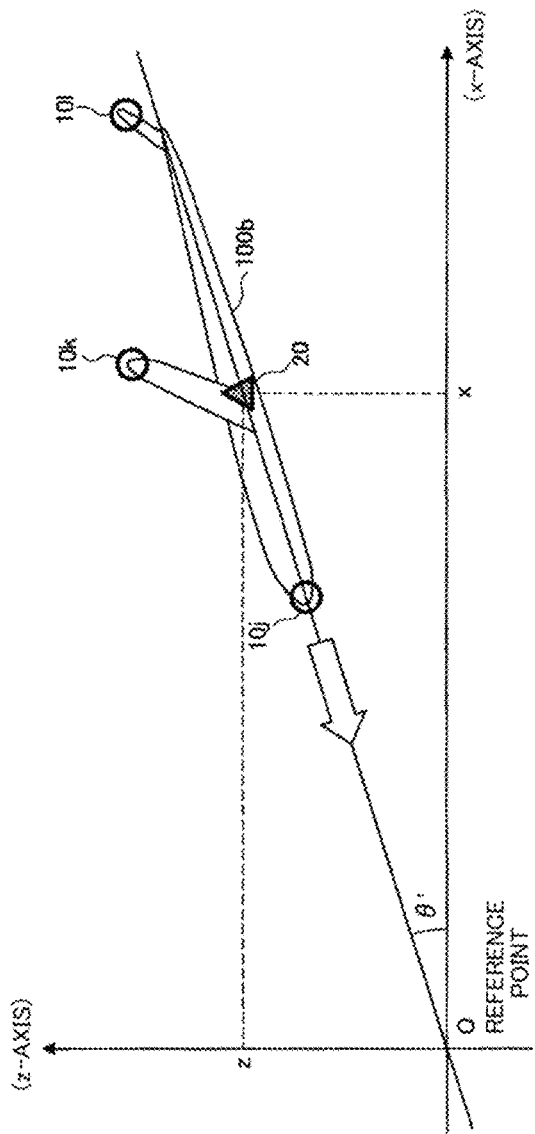
FIG. 22 is a diagram for illustrating the method of specifying the position and the orientation of the glider as a type of the mobile device 100.

As also illustrated in FIGS. 21 and 22, the mobile device 100 may also be a glider (or an aerodrone which is an aircraft using no power and having a fixed wing). At this time, as illustrated in FIGS. 21 and 22, the position specification unit 111b and the direction specification unit 111c of the mobile device 100a can specify, based on a feature domain 10j in the nose, feature domains 10k in the main wing, and feature domains 10l in a tail, the positional coordinates of the mobile device 100b (the gravity center 20 of the mobile device 100b) and the orientation thereof (the angle θ in the xy plane illustrated in FIG. 21 and the angle θ' in the xz plane illustrated in FIG. 22).

Figure 23:
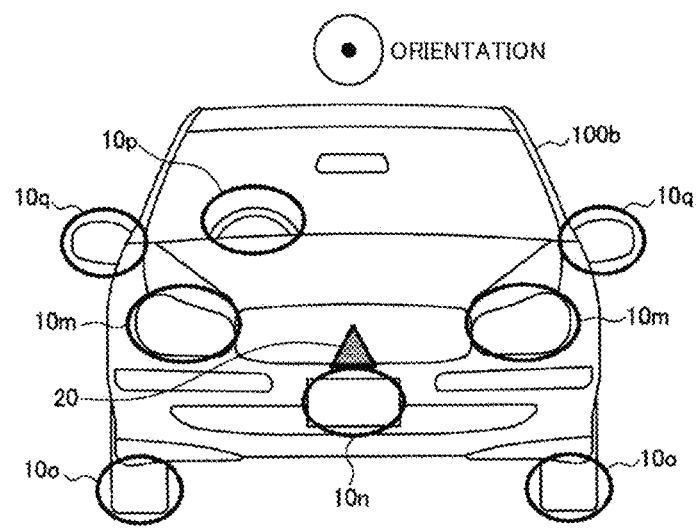
FIG. 23 is a diagram for illustrating a method of specifying a position and an orientation of an automobile as a type of the mobile device 100.
Figure 24:
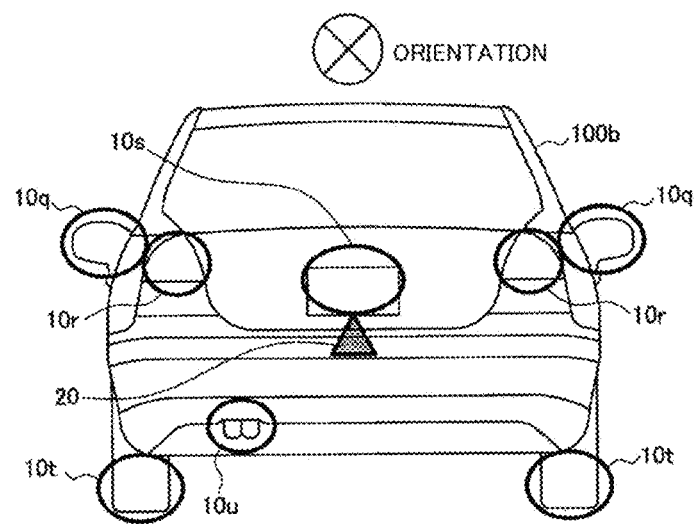
FIG. 24 is a diagram for illustrating the method of specifying the position and the orientation of the automobile as a type of the mobile device 100.
Figure 25:
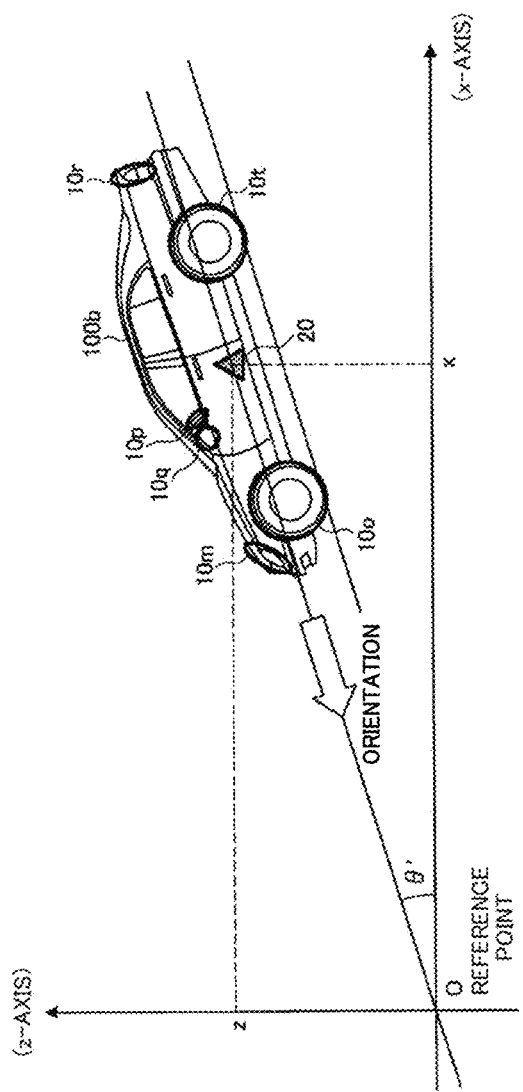
FIG. 25 is a diagram for illustrating the method of specifying the position and the orientation of the automobile as a type of the mobile device 100.

Alternatively, the mobile device 100 may also be a movable (flightless) device. For example, as illustrated in FIGS. 23 to 25, the mobile device 100 may also be an automobile. At this time, as illustrated in FIGS. 23 to 25, the position specification unit 111b and the direction specification unit 111c of the mobile device 100a can specify, based on feature domains 10m in headlights, a feature domain 10n in a front number plate, feature domains 10o in front wheels, a feature domain 10p in a steering wheel, feature domains 10q in side mirrors, feature domains 10r in taillights, a feature domain 10s in a rear number plate, feature domains 10t in rear wheels, and a feature domain 10u in a muffler, the positional coordinates of the mobile device 100b (the gravity center 20 of the mobile device 100b) and the orientation thereof (the angle θ in the xy plane and the angle θ' in the xz plane illustrated in FIG. 25).

Note that the mobile device 100 may not only be the automobile, but also be a motorcycle, a bicycle, a railroad vehicle running on a railroad, a vessel travelling on water, an electric appliance (such as, e.g., an autonomously moving cleaner), a robot (such as, e.g., a humanoid robot or an autonomous transfer robot), or the like.

When the plurality of mobile devices 100 are present in each of the first embodiment (system in which the mobile devices 100 autonomously move) and the second embodiment (system in which the mobile devices 100 move under the control of the flight control device 200), the respective mobile devices 100 may be of different types. For example, when there are the mobile device 100a and the mobile device 100b, both of the mobile device 100a and the mobile device 100b may be flyable devices, both of the mobile device 100a and the mobile device 100b may be merely movable devices each not having a flying function, or only one of the mobile device 100a and the mobile device 100b may be a flyable device, while the other thereof is a merely movable device not having the flying function.

3.2. Variation of Method of Specifying Orientation

Subsequently, a description will be given of a variation of a method in which the orientation is specified by the mobile device 100.

In each of the embodiments described above, the description has been given of the specification of the orientation of the mobile device 100b by the direction specification unit 111c of the mobile device 100a based on the features (feature domains 10) of the mobile device 100b, which are observed in the imaging data. However, the direction specification unit 111c may also specify the orientation of the mobile device 100b based on something other than the features of the mobile device 100b.

Figure 26:
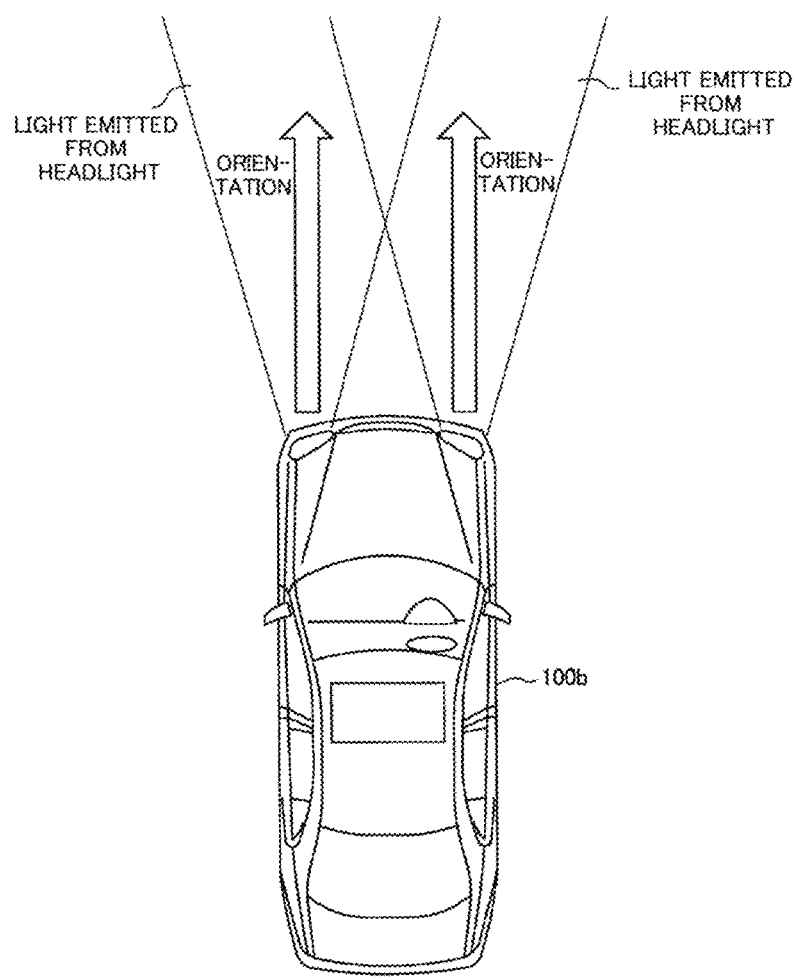
FIG. 26 is a diagram for illustrating a method of specifying the orientation of the mobile device 100 based on light emitted from the mobile device 100.

For example, the direction specification unit 111c may also specify the orientation of the mobile device 100b based on light emitted from the mobile device 100b, which is observed in the imaging data. For example, when the mobile device 100b is an automobile as illustrated in FIG. 26, the direction specification unit 111c may also analyze the imaging data to detect light emitted from the headlights of the automobile serving as the mobile device 100b and specify a direction of an optical axis (virtual light beam representing an optical flux) of the light as the orientation of the mobile device 100b. Note that the direction specification unit 111c may also use any light for the specification of the orientation as long as the light is emitted from the mobile device 100b.

Figure 27:
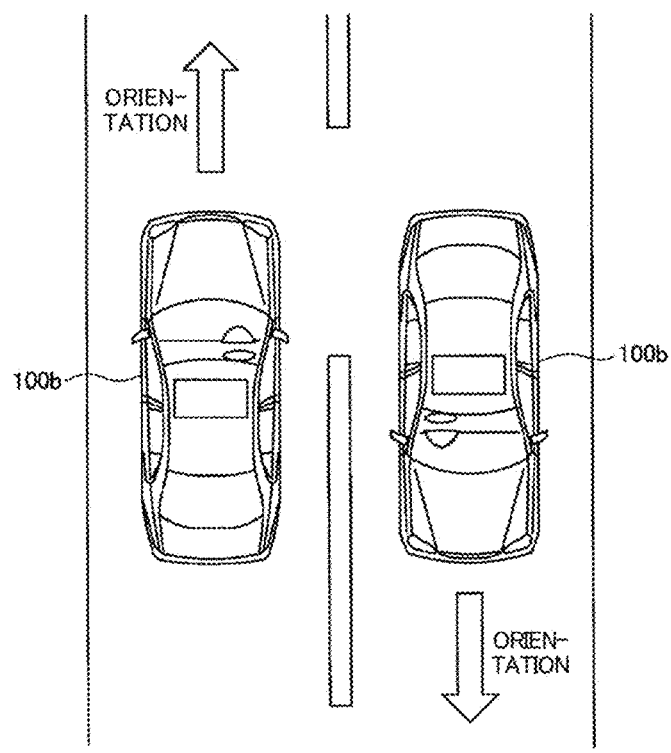
FIG. 27 is a diagram for illustrating a method of specifying the orientation of the mobile device 100 based on an environment around the mobile device 100.

Alternatively, the direction specification unit 111c may also specify the orientation of the mobile device 100b based on the environment around the mobile device 100b, which is observed in the imaging data. For example, when the mobile device 100b is an automobile as illustrated in FIG. 27, the direction specification unit 111c of the mobile device 100a may also analyze the imaging data to recognize a road situation in which the mobile device 100b is located and specify a direction in which the mobile device 100b can travel in the road situation as the orientation of the mobile device 100b. For example, when the mobile device 100b is a railroad vehicle, the direction specification unit 111c may also analyze the imaging data to recognize a railroad situation in which the mobile device 100b is located and specify the direction in which the mobile device 100b can travel in the railroad situation as the orientation of the mobile device 100b. When the orientation of one of the mobile devices 100b is specified, the direction specification unit 111c may also assign the orientation of the mobile device 100b of concern to the orientation of another mobile device 100b located in the vicinity of the mobile device 100b of concern. When the plurality of mobile devices 100b located close to each other are oriented in substantially the same direction (such as when, e.g., the plurality of mobile devices 100b are arranged in line), the direction specification unit 111c can more efficiently specify the orientations of the plurality of mobile devices 100b by using the method. When the mobile device 100b is a vessel traveling on water, the direction specification unit 111c may also specify the orientation of the mobile device 100b based on shapes of waves formed as a result of the travel of the mobile device 100b. When the mobile device 100b is an aircraft such as an airplane, the direction specification unit 111c may also specify the orientation of the mobile device 100b based on a shape of cloud (such as a contrail) formed as a result of the travel of the mobile device 100b. When the mobile device 100b is a manned movable device such as an automobile or a motorcycle, the direction specification unit 111c may also specify the orientation of the mobile device 100b based on an orientation of a face of an occupant of the mobile device 100b.

The direction specification unit 111c may also specify the orientation of the mobile device 100b based on previous history information related to the orientation of the mobile device 100b. For example, when the mobile device 100a specified the orientation and the positional coordinates of one of the mobile devices 100b at a given previous time point, the mobile device 100a stores the orientation and the position as the history information. Then, when the same mobile device 100b (or another mobile device 100b) moves to substantially the same positional coordinates, the direction specification unit 111c may also assign the orientation stored as the history information to be the orientation of the mobile device 100b. When a rough direction is determined as an air route, a road, a railway, a water route, or the like based on the positional coordinates, the direction specification unit 111c can more appropriately specify the orientation of the mobile device 100b by using the previous history information as described above.

Figure 28:
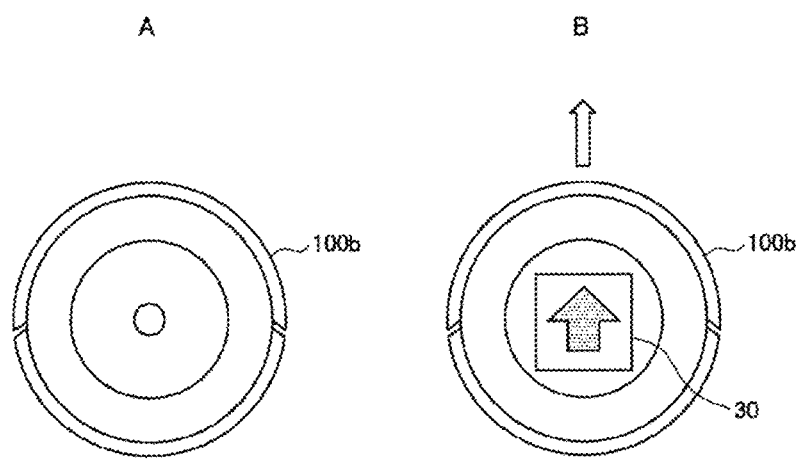
FIG. 28 is a diagram for illustrating a method of specifying the orientation of the mobile device 100 based on a marker added to the mobile device 100.

The direction specification unit 111c may also specify the orientation of the mobile device 100b based on a marker 30 added to the mobile device 100b, which is observed in the imaging data. For example, when the mobile device 100b is an autonomously movable cleaning robot or the like as illustrated in A of FIG. 28 and features thereof scarcely change in each direction, mere the features (the feature domains 10) of the mobile device 100b may degrade accuracy of the specification of the orientation. In such a case, a user adds, to the mobile device 100b, the marker 30 indicating a given direction (the marker 30 indicating an arrow direction in this example) as illustrated in B of FIG. 28 and can thus assign a direction intended by the user to the orientation of the mobile device 100b. The direction specification unit 111c analyzes the imaging data and can thus recognize the marker 30 and assign the direction indicated by the marker 30 to the orientation of the mobile device 100b. Even when it is difficult to specify the orientation of the mobile device 100b through mere use of the features thereof or when the mobile device 100b is an unknown tangible entity, the marker 30 added to the mobile device 100b may allow the orientation of the mobile device 100b to be specified.

Note that the direction specification unit 111c can implement the various methods of specifying the orientation described above in combination and can appropriately change a combination thereof. For example, the direction specification unit 111c can change the combination of the various methods of specifying the orientation described above depending on an environment in which the mobile device 100b is imaged or the like. As a result, even when the environment in which the mobile device 100b is imaged has deteriorated, the direction specification unit 111c can specify the orientation of the mobile device 100b with higher accuracy.

4. Notes

The description has been given heretofore of the modifications according to the present disclosure. Subsequently, a description will be given of specification of the orientation and the positional coordinates by the plurality of mobile devices 100 and of tracking of the mobile device 100. More specifically, to specify the orientation and the positional coordinates of another mobile device 100, the mobile devices 100 may also track the other mobile device 100 or the plurality of mobile devices 100 may cooperate with each other.

Figure 29:
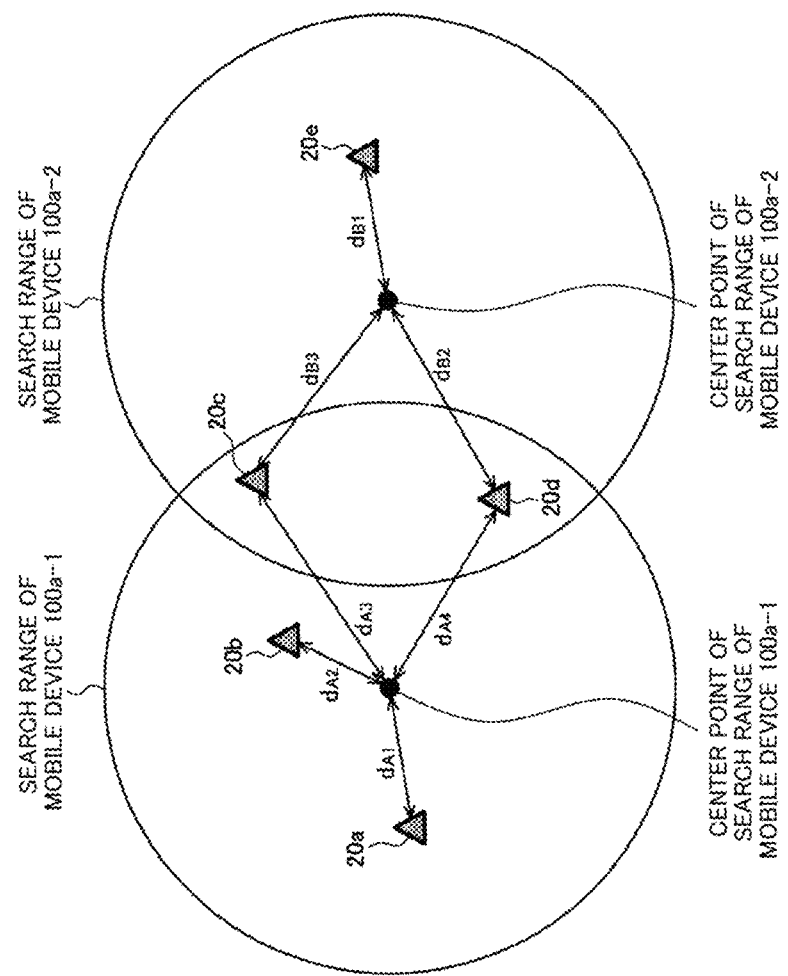
FIG. 29 is a diagram for illustrating a specific example when a plurality of the mobile devices 100 move (fly) in cooperation with each other.

For example, when there are two or more mobile devices 100a, the individual mobile devices 100a move (fly) in cooperation with each other to specify the orientation and the positional coordinates of the mobile device 100b. For example, when there are the mobile device 100a-1 and the mobile device 100a-2 as illustrated in FIG. 29, the respective movement control units 112 of the mobile devices 100a basically control the movement (flight) such that an overlapping portion between respective search ranges (the search ranges have circular shapes in the drawing, but the shapes thereof are not limited thereto) thereof is not larger than a predetermined area. This allows the movement control units 112 to more efficiently perform the specification of the orientation and the positional coordinates of the mobile device 100b or the like.

The movement control unit 112 may also control the movement (flight) of the local device based on a change in a relative positional relationship between the local device and the mobile device 100b to thus track at least one of the mobile devices 100b. For example, the movement control unit 112 calculates, for each unit time $\Delta t$, distances between the positions of the mobile devices 100b present within the search range of the local device and a center point of the search range. More specifically, in FIG. 29, the movement control unit 112 of the mobile device 100a-1 calculates, for each unit time $\Delta t$, distances ($d_{A1}$ to $d_{A4}$) between respective positions of gravity centers 20a to 20d of the individual mobile devices 100b present within the search range and the center point of the search range (note that, in FIG. 29, the main bodies of the mobile devices 100b are not illustrated for the sake of convenience). Likewise, the movement control unit 112 of the mobile device 100a-2 calculates, for each unit time $\Delta t$, distances ($d_{B1}$ to $d_{B3}$) between respective positions of gravity centers 20c to 20e of the individual mobile devices 100b present within the search range and the center point of the search range. Then, the movement control unit 112 of each of the mobile devices 100a controls the flight of the local device so as to minimize (or reduce, to a value smaller than a predetermined value) a total value (or an average value) of amounts of time derivative of the distances ($d_{A1}$ to $d_{A4}$ and $d_{B1}$ to $d_{B3}$) between the individual mobile devices 100b and the center point of the search range. As a result, when all the mobile devices 100b included in the search range are moving in substantially the same direction, the mobile device 100a can move (fly) so as to track all the mobile devices 100b while, when the individual mobile devices 100b included in the search range are moving in different directions, the mobile device 100a can more efficiently implement the tracking of the individual mobile devices 100b.

Note that, when the individual mobile devices 100b included in the search range are moving in different directions, the movement control unit 112 may also change the position (flight height) of the local device to a higher level to more efficiently implement the tracking of the individual mobile devices 100b. When priorities (or predetermined information equivalent to the priorities) are given to the individual mobile devices 100b, the movement control unit 112 may also control the movement (flight) of the local device such that the mobile device 100b having the higher priority is more preferentially tracked.

In FIG. 29, the mobile device 100b (hereinafter referred to as the "mobile device 100b-1") having the gravity center 20c and the mobile device 100b (hereinafter referred to as the "mobile device 100b-2") having the gravity center 20d are included in the search ranges of both of the mobile device 100a-1 and the mobile device 100a-2. Accordingly, the mobile device 100a-1 and the mobile device 100a-2 may also share the tracking of the mobile device 100b-1 and the mobile device 100b-2 (in other words, when the mobile devices 100b specified by the mobile device 100a are also observed in the imaging data obtained by aerial photography by another mobile device 100a and specified thereby, these mobile devices 100a may also share the tracking of the mobile devices 100b). For example, the movement control unit 112 of each of the mobile device 100a-1 and the mobile device 100a-2 may also determine, by a given arithmetic operation, which one of the mobile device 100a-1 and the mobile device 100a-2 is to track the mobile device 100b-1 or the mobile device 100b-2 (or track both of the mobile device 100b-1 and the mobile device 100b-2) (in other words, the movement control unit 112 controls the movement (flight) such that at least one of the mobile device 100a-1 and the mobile device 100a-2 tracks each of the mobile devices 100b). Note that, for the mobile device 100b-1 and the mobile device 100b-2, based on a match between the positional coordinates output from the mobile device 100a-1 and the positional coordinates output from the mobile device 100a-2 (or differences between the respective positional coordinates which are not more than predetermined values), it is recognized that the mobile devices 100b (the mobile device 100b-1 and the mobile device 100b-2) captured by the mobile device 100a-1 are the same as the mobile devices 100b captured by the mobile device 100a-2.

5. Example of Hardware Configuration

The description has been given above of the modifications according to the present disclosure. Subsequently, referring to FIG. 30, a description will be given of an example of a hardware configuration of an information processing device 900 which implements each of the mobile devices 100 according to the first embodiment or the flight control device 200 according to the second embodiment.

Figure 30:
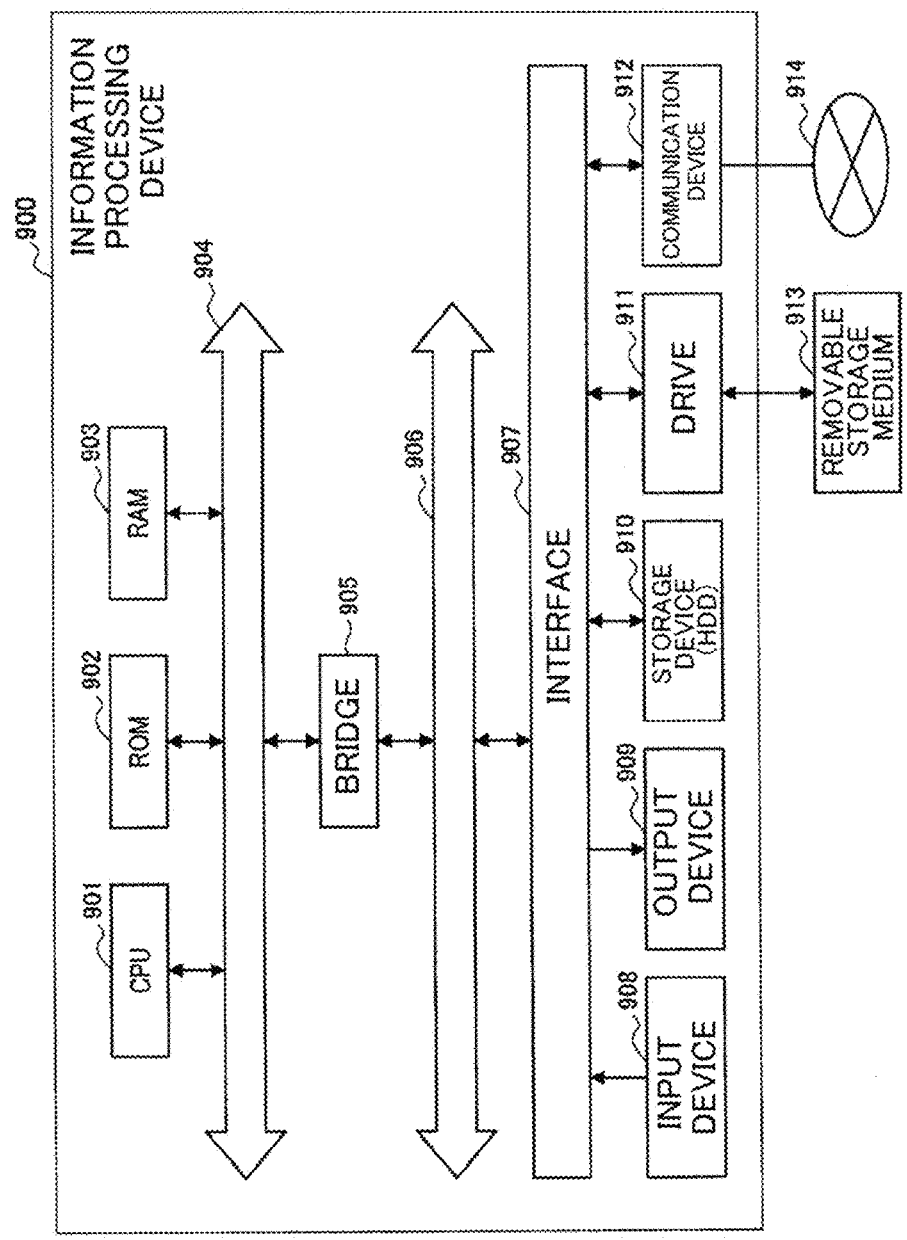
FIG. 30 is a block diagram illustrating an example of a hardware configuration of the mobile device 100 or the flight control device 200.

FIG. 30 is a diagram illustrating the hardware configuration of the information processing device 900. The information processing device 900 includes a CPU (Central Processing Unit) 901, a ROM (Read Only Memory) 902, a RAM (Random Access Memory) 903, a host bus 904, a bridge 905, an external bus 906, an interface 907, an input device 908, an output device 909, a storage device (HDD) 910, a drive 911, and a communication device 912.

The CPU 901 functions as an arithmetic processing device and a control device and general operation in the information processing device 900 according to various programs. The CPU 901 may also be a microprocessor. The ROM 902 stores programs, arithmetic parameters, and the like to be used by the CPU 901. The RAM 903 temporarily stores the programs to be used in execution by the CPU 901, the parameters that appropriately vary in the execution thereof, and the like. These are connected to each other by a host bus 904 including a CPU bus and the like. Through cooperation of the CPU 901, the ROM 902, and the RAM 903, the function of the control unit 110 of the mobile device 100 or the control unit 210 of the flight control device 200 is implemented.

The host bus 904 is connected to the external bus 906 such as a PCI (Peripheral Component Interconnect/Interface) bus via the bridge 905. Note that the host bus 904, the bridge 905, and the external bus 906 need not necessarily be separately configured. These functions may also be implemented by one bus.

The input device 908 includes an input means for the user to input information such as a mouse, a keyboard, a touch panel, a button, a microphone, a switch, a lever, or the like, an input control circuit which generates an input signal based on the input from the user and outputs the input signal to the CPU 901, and the like. A user of the information processing device 900 operates the input device 908 to be able to input various information to the individual devices or give an instruction to perform a processing operation. The input device 908 implements a function of an input unit (not shown) of each of the devices.

The output device 909 includes a display device such as, e.g., a CRT (Cathode Ray Tube) display device, a liquid crystal display (LCD) device, an OLED (Organic Light Emitting Diode) device, or a lamp. The output device 909 further includes an audio output device such as a speaker or a headphone. The display device displays various information such as reproduced video data in the form of a text or an image. Meanwhile, the audio output device converts reproduced audio data or the like to sounds and output the sounds. The output device 909 implements a function of an output unit (not shown) of each of the devices.

The storage device 910 is a device for storing data. The storage device 910 may also include a storage medium, a recording device which records data on the storage medium, a read device which reads the data from the storage medium, a deletion device which deletes the data recorded on the storage medium, and the like. The storage device 910 is formed of, e.g., a HDD (Hard Disk Drive). The storage device 910 drives a hard disk and stores programs to be executed by the CPU 901 and various data. The storage device 910 implements a function of the storage unit 150 of the mobile device 100 or the storage unit 230 of the flight control device 200.

The drive 911 is a storage medium read writer which is embedded in the information processing device 900 or provided outside the information processing device 900. The drive 911 reads information stored in a removable storage medium 913 attached thereto such as a magnetic disk, an optical disk, a magneto-optical disk, or a semiconductor memory and outputs the information to the RAM 903. The drive 911 can also write information on the removable storage medium 913.

The communication device 912 is, e.g., a communication interface formed of a communication device for connection to a communication network 914 or the like. The communication device 912 implements a function of the communication unit 120 of the mobile device 100 or the communication unit 220 of the flight control device 200.

6. Summary

As has been described heretofore, the present disclosure acquires the imaging data generated by the imaging unit 130 and analyzes the imaging data to be able to specify the orientation and the position of each of the mobile devices 100 observed in the imaging data. In addition, the present disclosure can predict, based on the orientation and the position of the mobile device 100, an orientation or a position of the mobile device 100 at a given future time point. Furthermore, the present disclosure can control the movement of the mobile device 100 based on the result of the prediction of the orientation or position.

As a result, when, e.g., it becomes necessary to manage the mobile devices 100 in a specified airspace, the present disclosure allows the management of the mobile devices 100 to be appropriately performed. The present disclosure also allows a situation of the mobile devices 100, a congestion situation of the airspace, and the like at a given future time point to be appropriately predicted. In addition, the present disclosure allows a collision between the plurality of mobile devices 100 to be appropriately avoided.

While the detailed description has been given heretofore of the preferred embodiments of the present disclosure with reference to the accompanying drawings, the technical scope of the present disclosure is not limited to those in such examples. It is clear that a person having ordinary knowledge in the technical field of the present disclosure can conceive of various modified examples or amended examples within the scope of the technical idea described in the claims, and it should be understood that these also belong to the technical scope of the present disclosure.

Note that the effects described in the present description are to be construed as merely descriptive or illustrative, and are not limitative. In other words, the technology according to the present disclosure can achieve, along with or instead of the above effects, other effects apparent to a person skilled in the art from the statement of the present description.

Note that configurations as shown below also belong to the technical scope of the present disclosure.

(1)

An information processing device comprising:
an acquisition unit that acquires imaging data; and
a direction specification unit that analyzes the imaging data to specify an orientation of a mobile device observed in the imaging data.

(2)

The information processing device according to (1) described above, wherein
the direction specifying unit specifies, as the orientation of the mobile device, at least one of a direction in which the mobile device is moving, a direction in which the mobile device is movable, and a direction in which the mobile device is expected to move.

(3)

The information processing device according to (1) or (2) described above, wherein the direction specification unit specifies, as the orientation of the mobile device, at least one of a two-dimensional direction and a three-dimensional direction in which the mobile device is oriented.

(4)

The information processing device according to any one of (1) to (3) described above, wherein
the direction specification unit specifies the orientation of the mobile device based on a feature of the mobile device, the feature being observed in the imaging data.

(5)

The information processing device according to any one of (1) to (4) described above, wherein
the direction specification unit specifies the orientation of the mobile device based on light emitted from the mobile device, the light being observed in the imaging data.

(6)

The information processing device according to any one of (1) to (5) described above, wherein
the direction specification unit specifies the orientation of the mobile device based on an environment around the mobile device, the environment being observed in the imaging data.

(7)

The information processing device according to any one of (1) to (6) described above, wherein
the direction specification unit specifies the orientation of the mobile device based on a marker added to the mobile device, the marker being observed in the imaging data.

(8)

The information processing device according to any one of (1) to (7) described above, wherein
the information processing device is a movable device including an imaging unit that generates the imaging data.

(9)

The information processing device according to any one of (1) to (7) described above, wherein
the imaging unit that generates the imaging data is provided in an external device serving as a movable device.

(10)

The information processing device according to (8) or (9) described above, wherein the movable device is capable of flying, and the imaging data is generated by aerial photography.

(11)

The information processing device according to any one of (8) to (10), further comprising:
a movement control unit that recognizes that the specification of the orientation of the mobile device is interrupted and controls the position to be moved forward/rearward, leftward/rightward, upward/downward, or a combination thereof.

(12)

The information processing device according to any one of (1) to (11) described above, further comprising:
a position specification unit that analyzes the imaging data to specify the position of the mobile device observed in the imaging data.

(13)

The information processing device according to (12) described above, further comprising:
a prediction unit that predicts, based on the orientation and the position, the orientation or the position of the mobile device at a given future time point.

(14)

The information processing device according to (13) described above, further comprising:
a mobile device control unit that controls, based on a result of predicting the orientation or the position of the mobile device, movement of the mobile device.

(15)

The information processing device according to (14) described above, wherein the mobile device control unit controls, based on the result of predicting the orientation or the position of the mobile device, the movement of the mobile device to avoid a collision between the mobile device and another object.

(16)

An information processing method to be implemented by a computer, the method comprising:
acquiring imaging data; and
analyzing the imaging data to specify an orientation of a mobile device observed in the imaging data.

(17)

A program for causing a computer to execute:
acquiring imaging data; and
analyzing the imaging data to specify an orientation of a mobile device observed in the imaging data.

(18)

A mobile device comprising:
an imaging unit that generates imaging data;
a communication unit that transmits the imaging data to an information processing device that analyzes the imaging data to specify an orientation of another mobile device observed in the imaging data; and
a movement control unit that moves the local device based on control by the information processing device.

REFERENCE SIGNS LIST

100 Mobile device
110 Control unit
111 Analysis unit
111a Device specification unit
111b Position specification unit
111c Direction specification unit
111d Prediction unit
112 Movement control unit
113 Mobile device control unit
120 Communication unit
130 Imaging unit
140 Sensor unit 150 Storage unit
160 Moving mechanism
200 Flight control device
210 Control unit
211 Analysis unit
211a Device specification unit
211b Position specification unit
211c Direction specification unit
211d Prediction unit
213 Mobile device control unit
220 Communication unit
230 Storage unit

The invention claimed is:

1. An information processing device comprising:
    circuitry configured to
    acquire imaging data,
    analyze the imaging data to specify an orientation of a mobile device observed in the imaging data,
    analyze the imaging data to specify the position of the mobile device observed in the imaging data,
    predict, based on the orientation and the position, the orientation or the position of the mobile device at a given future time point, and
    control, based on a result of predicting the orientation or the position of the mobile device, movement of the mobile device.

2. The information processing device according to claim 1, wherein
    the circuitry is configured to specify, as the orientation of the mobile device, at least one of a direction in which the mobile device is moving, a direction in which the mobile device is movable, and a direction in which the mobile device is expected to move.

3. The information processing device according to claim 1, wherein
    the circuitry is configured to specify, as the orientation of the mobile device, at least one of a two-dimensional direction and a three-dimensional direction in which the mobile device is oriented.

4. The information processing device according to claim 1, wherein
    the circuitry is configured to specify the orientation of the mobile device based on a feature of the mobile device, the feature being observed in the imaging data.

5. The information processing device according to claim 1, wherein
    the circuitry is configured to specify the orientation of the mobile device based on light emitted from the mobile device, the light being observed in the imaging data.

6. The information processing device according to claim 1, wherein
    the circuitry is configured to specify the orientation of the mobile device based on an environment around the mobile device, the environment being observed in the imaging data.

7. The information processing device according to claim 1, wherein
    the circuitry is configured to specify the orientation of the mobile device based on a marker added to the mobile device, the marker being observed in the imaging data.

8. The information processing device according to claim 1, wherein
    the information processing device is a movable device including a camera that generates the imaging data.

9. The information processing device according to claim 8, wherein
    the movable device is capable of flying, and the imaging data is generated by aerial photography.

10. The information processing device according to claim 8, wherein
    the circuitry recognizes that the specification of the orientation of the mobile device is interrupted and controls the position to be moved forward/rearward, leftward/rightward, upward/downward, or a combination thereof.

11. The information processing device according to claim 1, wherein
    the camera that generates the imaging data is provided in an external device serving as a movable device.

12. The information processing device according to claim 1, wherein
    the circuitry controls, based on the result of predicting the orientation or the position of the mobile device, the movement of the mobile device to avoid a collision between the mobile device and another object.

13. An information processing method to be implemented by a computer, the method comprising:
    acquiring imaging data;
    analyzing the imaging data to specify an orientation of a mobile device observed in the imaging data;
    analyzing the imaging data to specify the position of the mobile device observed in the imaging data;
    predicting, based on the orientation and the position, the orientation or the position of the mobile device at a given future time point; and
    controlling, based on a result of predicting the orientation or the position of the mobile device, movement of the mobile device.

14. A non-transitory computer-readable storage medium including computer executable instructions, wherein the instructions, when executed by a computer, cause the computer to perform a method, the method comprising:
    acquiring imaging data;
    analyzing the imaging data to specify an orientation of a mobile device observed in the imaging data;
    analyzing the imaging data to specify the position of the mobile device observed in the imaging data;
    predicting, based on the orientation and the position, the orientation or the position of the mobile device at a given future time point; and
    controlling, based on a result of predicting the orientation or the position of the mobile device, movement of the mobile device.

* * * * *